(12) United States Patent
Lee et al.

(10) Patent No.: US 12,143,744 B2
(45) Date of Patent: Nov. 12, 2024

(54) SIGNAL PROCESSING DEVICE AND VIDEO DISPLAY DEVICE HAVING SAME

(71) Applicant: LG ELECTRONICS INC., Seoul (KR)

(72) Inventors: Jangwon Lee, Seoul (KR); Kibeom Kim, Seoul (KR); Gijun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 119 days.

(21) Appl. No.: 17/997,345

(22) PCT Filed: Apr. 28, 2020

(86) PCT No.: PCT/KR2020/005589
§ 371 (c)(1),
(2) Date: Oct. 27, 2022

(87) PCT Pub. No.: WO2021/221194
PCT Pub. Date: Nov. 4, 2021

(65) Prior Publication Data
US 2023/0224425 A1     Jul. 13, 2023

(51) Int. Cl.
*H04N 5/04*     (2006.01)
*G06T 1/20*     (2006.01)
*H04N 19/44*     (2014.01)

(52) U.S. Cl.
CPC ............. *H04N 5/04* (2013.01); *G06T 1/20* (2013.01); *H04N 19/44* (2014.11)

(58) Field of Classification Search
CPC ........ H04N 5/04; H04N 19/44; H04N 7/0127; G06T 1/20; G09G 2370/20; G09G 5/006; G09G 5/12
See application file for complete search history.

(56) References Cited

U.S. PATENT DOCUMENTS 8,719,442 B2   5/2014   Lee et al.
9,589,540 B2 *   3/2017   Wu ..................... G06F 1/3265
(Continued)

FOREIGN PATENT DOCUMENTS

JP   2013128266    6/2013
KR   101455391    10/2014
(Continued)

OTHER PUBLICATIONS

PCT International Application No. PCT/KR2020/005589, International Search Report dated Jan. 22, 2021, 3 pages.

*Primary Examiner* — Michael Lee
(74) *Attorney, Agent, or Firm* — LEE, HONG, DEGERMAN, KANG & WAIMEY

(57) ABSTRACT

The present invention relates to a signal processing device and a video display device having same. A signal processing device according to one embodiment of the present invention comprises: a decoder for decoding first video data from a first video source and second video data from a second video source to output decoded first video data and decoded second video data; a video quality processing unit for, when a common frame rate is set on the basis of a first frame rate of the first video data and a second frame rate of the second video data, outputting the first video data on the basis of the common frame rate; and a graphic processing unit for outputting the second video data on the basis of the common frame rate. Thereby, it is possible to process a plurality of video data in synchronization.

18 Claims, 16 Drawing Sheets

(56) References Cited

U.S. PATENT DOCUMENTS

| | | | |
|---|---|---|---|
| 2003/0038807 A1* | 2/2003 | Demos | G11B 27/3036 |
| 2004/0257434 A1* | 12/2004 | Davis | H04N 21/4788 |
| | | | 348/14.1 |
| 2009/0310023 A1* | 12/2009 | Nakayama | H04N 9/76 |
| | | | 348/E7.003 |
| 2012/0092443 A1* | 4/2012 | Mauchly | H04N 21/2665 |
| | | | 348/E7.083 |
| 2016/0140733 A1* | 5/2016 | Gu | H04N 13/172 |
| | | | 348/43 |
| 2021/0274251 A1* | 9/2021 | Wang | H04N 21/440281 |

FOREIGN PATENT DOCUMENTS

| | | |
|---|---|---|
| KR | 1020150071505 | 6/2015 |
| KR | 1020180024808 | 3/2018 |
| KR | 101967818 | 4/2019 |

\* cited by examiner

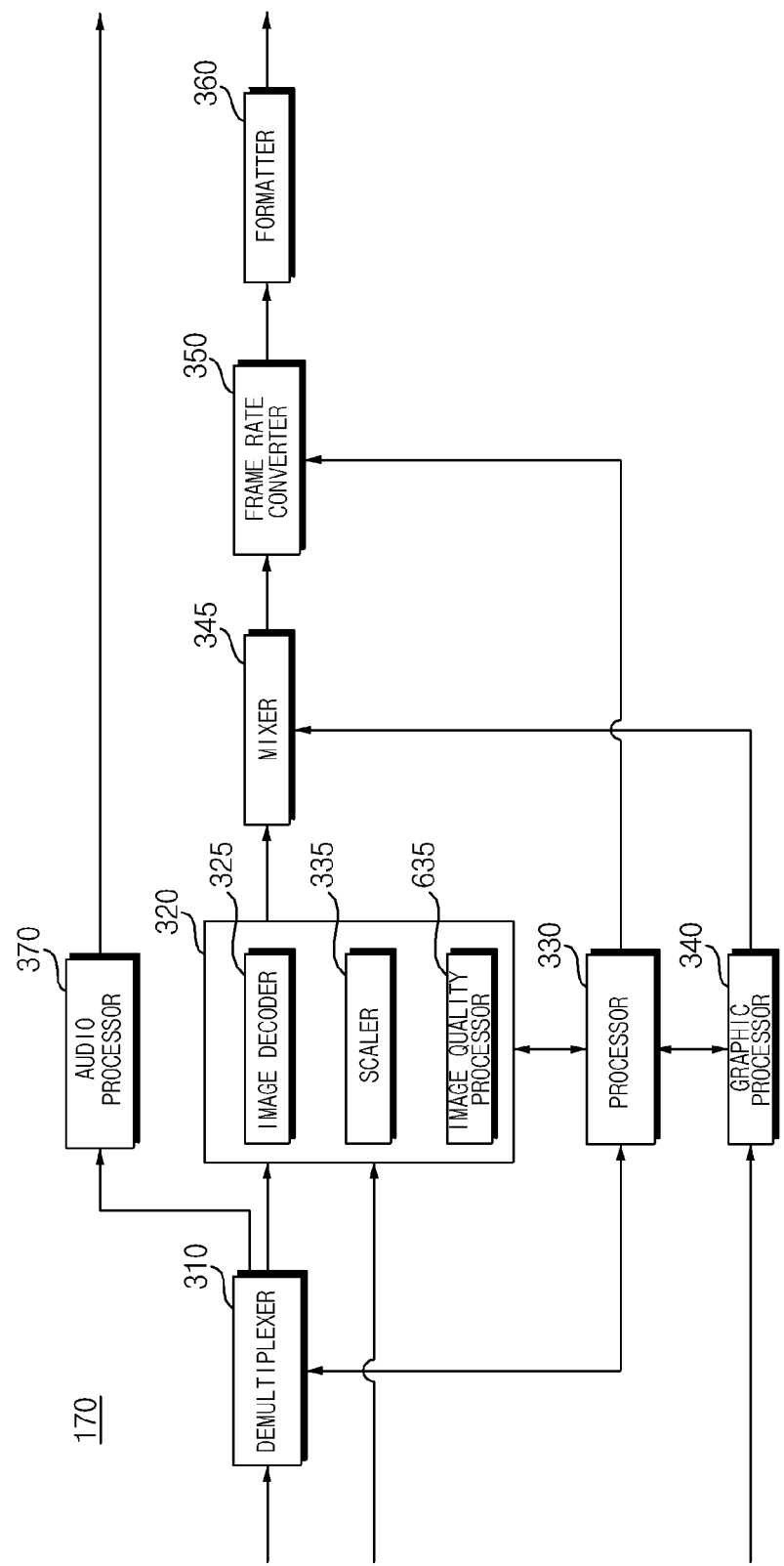

(a) (b) (c)

SIGNAL PROCESSING DEVICE AND VIDEO DISPLAY DEVICE HAVING SAME

CROSS-REFERENCE TO RELATED APPLICATION(S)

This application is the National Stage filing under 35 U.S.C. 371 of International Application No. PCT/KR2020/005589, filed on Apr. 28, 2020, the contents of which are all incorporated by reference herein in its entirety.

BACKGROUND

1. Field of the Disclosure

The present disclosure relates to a signal processing device and an image display apparatus including the same, and more particularly to a signal processing device capable of processing a plurality of video data in a synchronized manner, and an image display apparatus including the same.

2. Description of the Related Art

A signal processing device is a device for performing signal processing on an input image signal.

For example, when a plurality of video data are input to the signal processing device to be displayed on one screen, the signal processing device is required to perform signal processing on each of the plurality of video data.

Particularly, an image quality processor in the image processing device is in charge of signal processing of the plurality of video data, such that the burden on the image quality processor increases.

Accordingly, research has been conducted on a method of performing signal processing of a portion of the plurality of video data by using a graphic processor separately from the image quality processor in the signal processing device.

However, if the plurality of video data have different frame rates, the data are not synchronized when signal processing is performed by each of the image quality processor and the graphic processor, such that the plurality of video data may not be displayed on one screen.

SUMMARY

It is an object of the present disclosure to provide a signal processing device capable of processing a plurality of video data in a synchronized manner, and an image display apparatus including the same.

In order to achieve the above objects, there are provided a signal processing device and an image display apparatus including the same according to an embodiment of the present disclosure, the signal processing device including: a decoder configured to decode a first video data from a first video source and a second video data from a second video source, and to output the decoded first video data and second video data; an image quality processor, in response to a common frame rate set based on a first frame rate of the first video data and a second frame rate of the second video data, configured to output the first video data based on the common frame rate; and a graphic processor configured to output the second video data based on the common frame rate.

Meanwhile, the signal processing device and the image display apparatus including the same according to an embodiment of the present disclosure may further include: a first image output interface configured to output the first video data to the image quality processor based on the common frame rate; and a second image output interface configured to output the second video data to the graphic processor based on the common frame rate.

Meanwhile, based on the common frame rate, the graphic processor may output the second video data by performing rendering; and based on the common frame rate, the image quality processor may output the second video data by performing rendering.

Meanwhile, the first image output interface or the second image output interface may set the common frame rate based on the first frame rate of the first video data and the second frame rate of the second video data.

Meanwhile, the first image output interface or the second image output interface may set, as the common frame rate, a least common multiple of the first frame rate of the first video data and the second frame rate of the second video data.

Meanwhile, in response to the least common multiple of the first frame rate of the first video data and the second frame rate of the second video data being not obtained, the first image output interface or the second image output interface may set an approximate value as the common frame rate.

Meanwhile, by decoding a third video data from a third video source, the decoder may further output the decoded third video data, wherein in response to a second common frame rate set based on the first frame rate of the first video data, the second frame rate of the second video data, and a third frame rate of the third video data, the first image output interface may output the first video data based on the second common frame rate, and the second image output interface may output the second video data and the third video data based on the second common frame rate.

Meanwhile, the second common frame rate may be greater than or equal to the common frame rate.

Meanwhile, by decoding a third video data from a third video source and a fourth video data from a fourth video source, the decoder may further output the decoded third video data and fourth video data, wherein in response to a third common frame rate set based on the first frame rate of the first video data, the second frame rate of the second video data, a third frame rate of the third video data, and a fourth frame rate of the fourth video data, the first image output interface may output the first video data based on the third common frame rate, and the second image output interface may output the second video data, the third video data, and the fourth video data based on the third common frame rate.

Meanwhile, the third common frame rate may be greater than or equal to the common frame rate.

Meanwhile, a size of the first video data output by the image quality processor may be greater than or equal to a size of the second video data output by the graphic processor.

In order to achieve the above objects, there are provided a signal processing device and an image display apparatus including the same according to another embodiment of the present disclosure, the signal processing device including: a decoder configured to decode a plurality of video data from a plurality of video sources; a first image output interface configured to output a first video data among the plurality of video data based on a common frame rate for the plurality of video data decoded by the decoder; an image quality processor configured to perform rendering of the first video data output from the first image output interface, and to output the rendered first video data; a second image output interface configured to output remaining video data, except the first video data, among the plurality of video data based on the common frame rate; and a graphic processor configured to perform rendering of the remaining video data output from the second image output interface, and to output the rendered remaining video data.

Meanwhile, the first image output interface and the second image output interface may operate in synchronization with each other.

Meanwhile, the image quality processor and the graphic processor may operate in synchronization with each other.

Meanwhile, the first image output interface may output the first video data based on a common vertical synchronization signal for the plurality of video data, wherein based on the common vertical synchronization signal for the plurality of video data, the second image output interface may output the remaining video data except the first video data.

Meanwhile, as a number of the plurality of video sources increases, the common frame rate may increase in a range of a first reference value or below.

Effects of the Disclosure

A signal processing device and an image display apparatus including the same according to an embodiment of the present disclosure include: a decoder configured to decode a first video data from a first video source and a second video data from a second video source, and to output the decoded first video data and second video data; an image quality processor, in response to a common frame rate set based on a first frame rate of the first video data and a second frame rate of the second video data, configured to output the first video data based on the common frame rate; and a graphic processor configured to output the second video data based on the common frame rate. Accordingly, the plurality of video data is capable of being processed in a synchronized manner. Particularly, even when synchronization information for the plurality of video data is erroneous, the plurality of video data may be processed in a synchronized manner based on the calculated common frame rate.

Meanwhile, the signal processing device and the image display apparatus including the same according to an embodiment of the present disclosure may further include: a first image output interface configured to output the first video data to the image quality processor based on the common frame rate; and a second image output interface configured to output the second video data to the graphic processor based on the common frame rate. Accordingly, by using the first image output interface and the second image output interface, the plurality of video data is capable of being processed in a synchronized manner.

Meanwhile, based on the common frame rate, the graphic processor may output the second video data by performing rendering; and based on the common frame rate, the image quality processor may output the second video data by performing rendering. Accordingly, by using the graphic processor, the plurality of video data may be processed in a synchronized manner, while reducing an operation burden on the image quality processor.

Meanwhile, the first image output interface or the second image output interface may set the common frame rate based on the first frame rate of the first video data and the second frame rate of the second video data. Accordingly, the plurality of video data is capable of being processed in a synchronized manner.

Meanwhile, the first image output interface or the second image output interface may set, as the common frame rate, a least common multiple of the first frame rate of the first video data and the second frame rate of the second video data. Accordingly, the common frame rate may be set in a simple manner, and thus, the plurality of video data may be processed in a synchronized manner.

Meanwhile, in response to the least common multiple of the first frame rate of the first video data and the second frame rate of the second video data being not obtained, the first image output interface or the second image output interface may set an approximate value as the common frame rate. Accordingly, the common frame rate may be set, and thus, the plurality of video data may be processed in a synchronized manner.

Meanwhile, by decoding a third video data from a third video source, the decoder may further output the decoded third video data, wherein in response to a second common frame rate set based on the first frame rate of the first video data, the second frame rate of the second video data, and a third frame rate of the third video data, the first image output interface may output the first video data based on the second common frame rate, and the second image output interface may output the second video data and the third video data based on the second common frame rate. Accordingly, the second common frame rate may be set, and thus, the plurality of video data may be processed in a synchronized manner.

Meanwhile, the second common frame rate may be greater than or equal to the common frame rate. Accordingly, as the number of the plurality of video data increases, the common frame rate increases.

Meanwhile, by decoding a third video data from a third video source and a fourth video data from a fourth video source, the decoder may further output the decoded third video data and fourth video data, wherein in response to a third common frame rate set based on the first frame rate of the first video data, the second frame rate of the second video data, a third frame rate of the third video data, and a fourth frame rate of the fourth video data, the first image output interface may output the first video data based on the third common frame rate, and the second image output interface may output the second video data, the third video data, and the fourth video data based on the third common frame rate. Accordingly, the third common frame rate may be set, and thus, the plurality of video data may be processed in a synchronized manner.

Meanwhile, the third common frame rate may be greater than or equal to the common frame rate. Accordingly, as the number of the plurality of video data increases, the common frame rate increases.

Meanwhile, a size of the first video data output by the image quality processor may be greater than or equal to a size of the second video data output by the graphic processor. Accordingly, the first video data may be displayed as a main image on the image display apparatus.

A signal processing device and an image display apparatus including the same according to another embodiment of the present disclosure include: a decoder configured to decode a plurality of video data from a plurality of video sources; a first image output interface configured to output a first video data among the plurality of video data based on a common frame rate for the plurality of video data decoded by the decoder; an image quality processor configured to perform rendering of the first video data output from the first image output interface, and to output the rendered first video data; a second image output interface configured to output remaining video data, except the first video data, among the plurality of video data based on the common frame rate; and a graphic processor configured to perform rendering of the remaining video data output from the second image output interface, and to output the rendered remaining video data. Accordingly, the plurality of video data is capable of being processed in a synchronized manner. Particularly, even when synchronization information for the plurality of video data is erroneous, the plurality of video data may be processed in a synchronized manner based on the calculated common frame rate.

Further, by minimizing unnecessary operation for synchronization, the plurality of video data may be provided with a small amount of computation.

Meanwhile, the first image output interface and the second image output interface may operate in synchronization with each other. Accordingly, by using the first image output interface and the second image output interface, the plurality of video data is capable of being processed in a synchronized manner.

Meanwhile, the image quality processor and the graphic processor may operate in synchronization with each other. Accordingly, by using the image quality processor and the graphic processor, the plurality of video data may be processed in a synchronized manner.

Meanwhile, the first image output interface may output the first video data based on a common vertical synchronization signal for the plurality of video data, wherein based on the common vertical synchronization signal for the plurality of video data, the second image output interface may output the remaining video data except the first video data. Accordingly, the plurality of video data is capable of being processed in a synchronized manner.

Meanwhile, as a number of the plurality of video sources increases, the common frame rate may increase in a range of a first reference value or below. Accordingly, as the number of the plurality of video data increases, the common frame rate may increase.

BRIEF DESCRIPTION OF THE DRAWINGS

FIG. 3 is an example of an internal block diagram of the signal processor in FIG. 2;

DETAILED DESCRIPTION OF THE PREFERRED EMBODIMENTS

Hereinafter, the present disclosure will be described in detail with reference to the accompanying drawings.

With respect to constituent elements used in the following description, suffixes "module" and "unit" are given only in consideration of ease in the preparation of the specification, and do not have or serve as different meanings. Accordingly, the suffixes "module" and "unit" may be used interchangeably.

Figure 1:
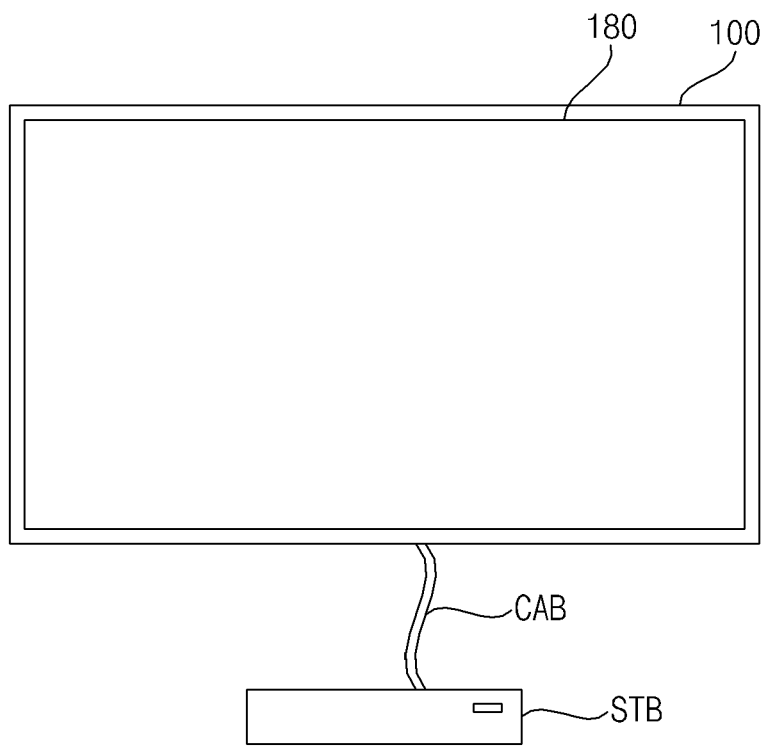
FIG. 1 is a diagram illustrating an image display system according to an embodiment of the present disclosure.

FIG. 1 is a diagram illustrating an image display system according to an embodiment of the present disclosure.

Referring to the drawing, an image display apparatus 100 may include a display 180.

Meanwhile, the display 180 may be implemented with any one of various panels. For example, the display 180 may be any one of a liquid crystal display panel (LCD panel), an organic light emitting diode panel (OLED panel), and an inorganic light emitting diode panel (LED panel).

The image display apparatus 100 may be connected to an external device via a cable (CAB) and the like. Further, by processing a signal received from the external device STB, the image display apparatus 100 may display an image or may output sound.

For example, if the external device STB is a set-top box capable of simultaneously receiving a plurality of broadcast channels, the image display apparatus 100 may receive a plurality of broadcast signals from the external device STB.

In this case, the image display apparatus 100 may display a plurality of broadcast images corresponding to the plurality of broadcast channels.

Meanwhile, in order to simultaneously display the plurality of broadcast images, a signal processing device 170 in the image display apparatus 100 is required to perform signal processing on the plurality of broadcast images.

Meanwhile, the image display apparatus 100 may receive a plurality of video data from a plurality of video sources. In this case, the plurality of video sources may be received from an external server and the like, rather than the external device STB, or a combination thereof.

Accordingly, the present disclosure provides a method of signal processing by separating the plurality of video data by using an image quality processor 635 (see FIG. 11) and a graphic processor 340 (see FIG. 11).

Particularly, the present disclosure provides a method of signal processing by synchronizing video data when the image quality processor 635 (see FIG. 11) and the graphic processor 340 (see FIG. 11) perform processing on the video data.

That is, the signal processing device 170 and the image display apparatus 100 including the same according to an embodiment of the present disclosure may include: a decoder 325 (see FIG. 11) configured to decode a first video data Imga from a first video source ISa and a second video data Imgb from a second video source ISb, and to output the decoded first video data Imga and second video data Imgb; an image quality processor 635 (see FIG. 11), which in response to a common frame rate Fts being set based on a first frame rate Fta of the first video data Imga and a second frame rate Ftb of the second video data Imgb, is configured to output the first video data Imga based on the common frame rate Fts; and a graphic processor 340 (see FIG. 11) configured to output the second video data Imgb based on the common frame rate Fts. Accordingly, the plurality of video data is capable of being processed in a synchronized manner. Particularly, even when synchronization information for the plurality of video data is erroneous, the plurality of video data may be processed in a synchronized manner based on the calculated common frame rate Fts.

Meanwhile, the signal processing device 170 and the image display apparatus 100 including the same according to an embodiment of the present disclosure may further include: a first image output interface 10a (see FIG. 11) configured to output the first video data Imga based on the common frame rate Fts: and a second image output interface 10b (see FIG. 11) configured to output the second video data Imgb to the graphic processor 340 based on the common frame rate Fts. Accordingly, by using the first image output interface 10a (see FIG. 11) and the second image output interface 10b (see FIG. 11), the plurality of data may be processed in a synchronized manner.

Meanwhile, a signal processing device 170 and an image display apparatus 100 including the same according to another embodiment of the present disclosure may include: a decoder 325 (see FIG. 11) configured to decode a plurality of video data from a plurality of video sources; a first image output interface 10a (see FIG. 11) configured to output a first video data Imga among the plurality of video data based on a common frame rate Fts for the plurality of video data decoded by the decoder 325 (see FIG. 11); an image quality processor 635 (see FIG. 11) configured to perform rendering of the first video data Imga output from the first image output interface 10a, and to output the rendered first video data; a second image output interface 10b (see FIG. 11) configured to output remaining video data, except the first video data Imga, among the plurality of video data based on the common frame rate Fts; and a graphic processor 340 (see FIG. 11) configured to perform rendering of the remaining video data output from the second image output interface 10b, and to output the rendered remaining video data. Accordingly, the plurality of video data is capable of being processed in a synchronized manner. Particularly, even when synchronization information for the plurality of video data is erroneous, the plurality of video data may be processed in a synchronized manner based on the calculated common frame rate Fts.

Further, by minimizing unnecessary operation for synchronization, the plurality of video data may be provided with a small amount of computation.

Various methods of operating the above image display apparatus 100 will be described in further detail below with reference to FIG. 9 and the following figures.

Meanwhile, the image display apparatus 100 in FIG. 1 may be a TV, a monitor, a tablet PC, a mobile terminal, a display for a vehicle, etc.

Figure 2:
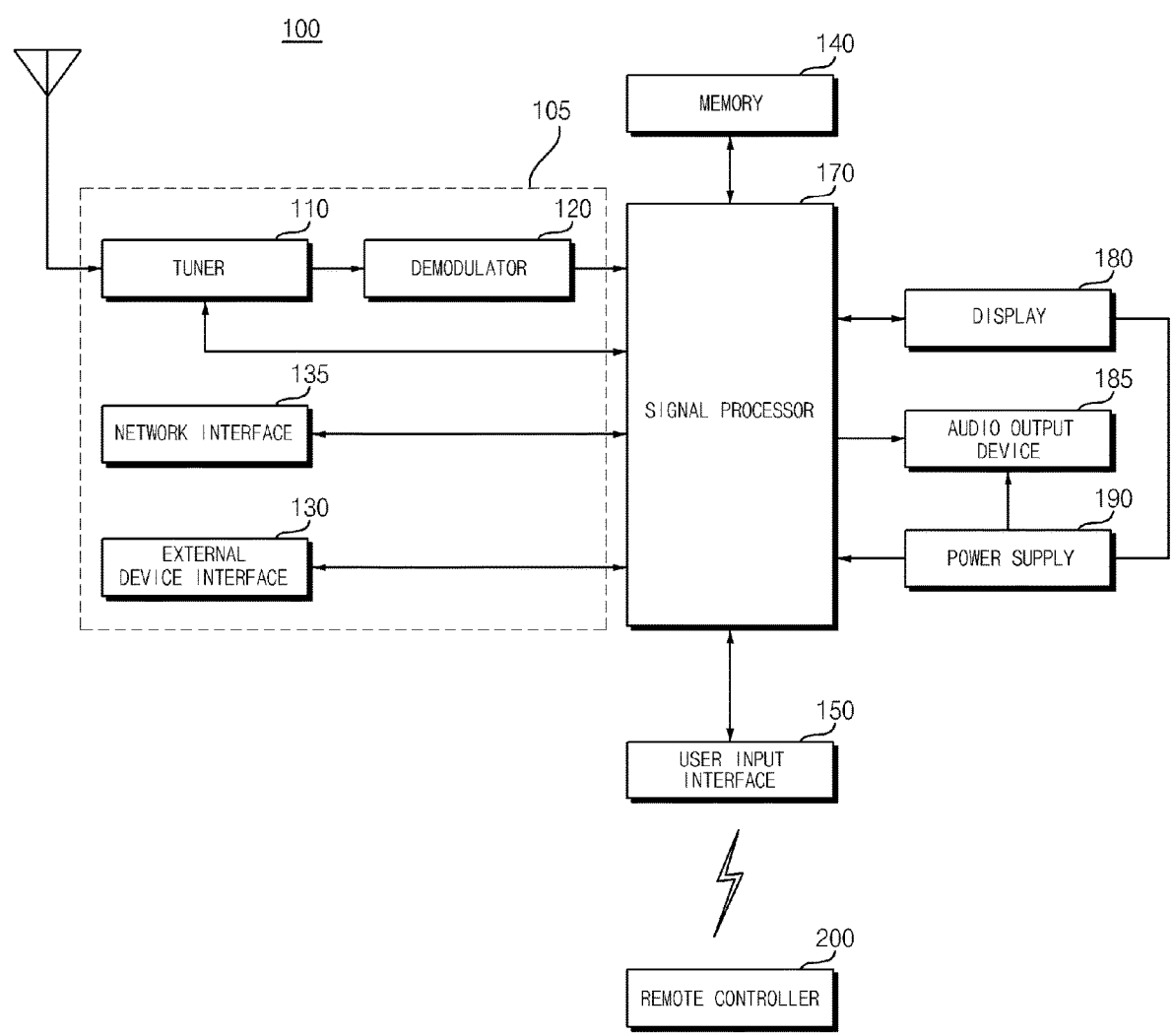
FIG. 2 is an example of an internal block diagram of the image display apparatus of FIG. 1.

FIG. 2 is an example of an internal block diagram of the image display apparatus of FIG. 1.

Referring to FIG. 2, the image display apparatus 100 according to an embodiment of the present disclosure includes an image receiver 105, an external apparatus interface 130, a memory 140, a user input interface 150, a sensor device (not shown), a signal processor 170, a display 180, and an audio output device 185.

The image receiver 105 may include a tuner 110, a demodulator 120, a network interface 135, and an external apparatus interface 130.

Meanwhile, unlike the drawing, the image receiver 105 may include only the tuner 110, the demodulator 120, and the external apparatus interface 130. That is, the network interface 135 may not be included.

The tuner 110 selects an RF broadcast signal corresponding to a channel selected by a user or all pre-stored channels among radio frequency (RF) broadcast signals received through an antenna (not shown). In addition, the selected RF broadcast signal is converted into an intermediate frequency signal, a baseband image, or an audio signal.

For example, if the selected RF broadcast signal is a digital broadcast signal, it is converted into a digital IF signal (DIF). If the selected RF broadcast signal is an analog broadcast signal, it is converted into an analog baseband image or audio signal (CVBS/SIF). That is, the tuner 110 can process a digital broadcast signal or an analog broadcast signal. The analog baseband image or audio signal (CVBS/SIF) output from the tuner 110 may be directly input to the signal processor 170.

Meanwhile, the tuner 110 can include a plurality of tuners for receiving broadcast signals of a plurality of channels. Alternatively, a single tuner that simultaneously receives broadcast signals of a plurality of channels is also available.

The demodulator 120 receives the converted digital IF signal DIF from the tuner 110 and performs a demodulation operation.

The demodulator 120 may perform demodulation and channel decoding and then output a stream signal TS. At this time, the stream signal may be a multiplexed signal of an image signal, a audio signal, or a data signal.

The stream signal output from the demodulator 120 may be input to the signal processor 170. The signal processor 170 performs demultiplexing, image/audio signal processing, and the like, and then outputs an image to the display 180 and outputs audio to the audio output device 185.

The external apparatus interface 130 may transmit or receive data with a connected external apparatus (not shown), e.g., a set-top box 50. To this end, the external apparatus interface 130 may include an A/V input and output device (not shown).

The external apparatus interface 130 may be connected in wired or wirelessly to an external apparatus such as a digital versatile disk (DVD), a Blu ray, a game equipment, a camera, a camcorder, a computer (note book), and a set-top box, and may perform an input/output operation with an external apparatus.

The A/V input and output device may receive image and audio signals from an external apparatus. Meanwhile, a wireless transceiver (not shown) may perform short-range wireless communication with other electronic apparatus.

Through the wireless transceiver (not shown), the external apparatus interface 130 may exchange data with an adjacent mobile terminal 600. In particular, in a mirroring mode, the external apparatus interface 130 may receive device information, executed application information, application image, and the like from the mobile terminal 600.

The network interface 135 provides an interface for connecting the image display apparatus 100 to a wired/wireless network including the Internet network. For example, the network interface 135 may receive, via the network, content or data provided by the Internet, a content provider, or a network operator.

Meanwhile, the network interface 135 may include a wireless transceiver (not shown).

The memory 140 may store a program for each signal processing and control in the signal processor 170, and may store signal-processed image, audio, or data signal.

In addition, the memory 140 may serve to temporarily store image, audio, or data signal input to the external apparatus interface 130. In addition, the memory 140 may store information on a certain broadcast channel through a channel memory function such as a channel map.

Although FIG. 2 illustrates that the memory is provided separately from the signal processor 170, the scope of the present disclosure is not limited thereto. The memory 140 may be included in the signal processor 170.

The user input interface 150 transmits a signal input by the user to the signal processor 170 or transmits a signal from the signal processor 170 to the user.

For example, the user input interface 150 may transmit/receive a user input signal such as power on/off, channel selection, screen setting, etc., from a remote controller 200, may transfer a user input signal input from a local key (not shown) such as a power key, a channel key, a volume key, a set value, etc., to the signal processor 170, may transfer a user input signal input from a sensor device (not shown) that senses a user's gesture to the signal processor 170, or may transmit a signal from the signal processor 170 to the sensor device (not shown).

The signal processor 170 may demultiplex the input stream through the tuner 110, the demodulator 120, the network interface 135, or the external apparatus interface 130, or process the demultiplexed signals to generate and output a signal for image or audio output.

For example, the signal processor 170 receives a broadcast signal received by the image receiver 105 or an HDMI signal, and perform signal processing based on the received broadcast signal or the HDMI signal to thereby output a processed image signal.

The image signal processed by the signal processor 170 is input to the display 180, and may be displayed as an image corresponding to the image signal. In addition, the image signal processed by the signal processor 170 may be input to the external output apparatus through the external apparatus interface 130.

The audio signal processed by the signal processor 170 may be output to the audio output device 185 as an audio signal. In addition, audio signal processed by the signal processor 170 may be input to the external output apparatus through the external apparatus interface 130.

Although not shown in FIG. 2, the signal processor 170 may include a demultiplexer, an image processor, and the like. That is, the signal processor 170 may perform a variety of signal processing and thus it may be implemented in the form of a system on chip (SOC). This will be described later with reference to FIG. 3.

In addition, the signal processor 170 can control the overall operation of the image display apparatus 100. For example, the signal processor 170 may control the tuner 110 to control the tuning of the RF broadcast corresponding to the channel selected by the user or the previously stored channel.

In addition, the signal processor 170 may control the image display apparatus 100 based on a user command input through the user input interface 150 or an internal program.

Meanwhile, the signal processor 170 may control the display 180 to display an image. At this time, the image displayed on the display 180 may be a still image or a moving image, and may be a 2D image or a 3D image.

Meanwhile, the signal processor 170 may display a certain object in an image displayed on the display 180. For example, the object may be at least one of a connected web screen (newspaper, magazine, etc.), an electronic program guide (EPG), various menus, a widget, an icon, a still image, a moving image, or a text.

Meanwhile, the signal processor 170 may recognize the position of the user based on the image photographed by a photographing device (not shown). For example, the distance (z-axis coordinate) between a user and the image display apparatus 100 can be determined. In addition, the x-axis coordinate and the y-axis coordinate in the display 180 corresponding to a user position can be determined.

The display 180 generates a driving signal by converting an image signal, a data signal, an OSD signal, a control signal processed by the signal processor 170, an image signal, a data signal, a control signal, and the like received from the external apparatus interface 130.

Meanwhile, the display 180 may be configured as a touch screen and used as an input device in addition to an output device.

The audio output device 185 receives a signal processed by the signal processor 170 and outputs it as an audio.

The photographing device (not shown) photographs a user. The photographing device (not shown) may be implemented by a single camera, but the present disclosure is not limited thereto and may be implemented by a plurality of cameras. Image information photographed by the photographing device (not shown) may be input to the signal processor 170.

The signal processor 170 may sense a gesture of the user based on each of the images photographed by the photographing device (not shown), the signals detected from the sensor device (not shown), or a combination thereof.

The power supply 190 supplies corresponding power to the image display apparatus 100. Particularly, the power may be supplied to a controller 170 which can be implemented in the form of a system on chip (SOC), a display 180 for displaying an image, and an audio output device 185 for outputting an audio.

Specifically, the power supply 190 may include a converter for converting an AC power into a DC power, and a DC/DC converter for converting the level of the DC power.

The remote controller 200 transmits the user input to the user input interface 150. To this end, the remote controller 200 may use Bluetooth, a radio frequency (RF) communication, an infrared (IR) communication, an Ultra Wideband (UWB), ZigBee, or the like. In addition, the remote controller 200 may receive the image, audio, or data signal output from the user input interface 150, and display it on the remote controller 200 or output it as an audio.

Meanwhile, the image display apparatus 100 may be a fixed or mobile digital broadcasting receiver capable of receiving digital broadcasting.

Meanwhile, a block diagram of the image display apparatus 100 shown in FIG. 2 is a block diagram for an embodiment of the present disclosure. Each component of the block diagram may be integrated, added, or omitted according to a specification of the image display apparatus 100 actually implemented. That is, two or more components may be combined into a single component as needed, or a single component may be divided into two or more components. The function performed in each block is described for the purpose of illustrating embodiments of the present disclosure, and specific operation and apparatus do not limit the scope of the present disclosure.

FIG. 3 is an example of an internal block diagram of the signal processor in FIG. 2.

Referring to the drawing, the signal processor 170 according to an embodiment of the present disclosure may include a demultiplexer 310, an image processor 320, a processor 330, and an audio processor 370. In addition, the signal processor 170 may further include and a data processor (not shown).

The demultiplexer 310 demultiplexes the input stream. For example, when an MPEG-2 TS is input, it can be demultiplexed into image, audio, and data signal, respectively. Here, the stream signal input to the demultiplexer 310 may be a stream signal output from the tuner 110, the demodulator 120, or the external apparatus interface 130.

The image processor 320 may perform signal processing on an input image. For example, the image processor 320 may perform image processing on an image signal demultiplexed by the demultiplexer 310.

To this end, the image processor 320 may include an image decoder 325, a scaler 335, an image quality processor 635, an image encoder (not shown), a graphic processor 340, a frame rate converter 350, a formatter 360, etc.

The image decoder 325 decodes a demultiplexed image signal, and the scaler 335 performs scaling so that the resolution of the decoded image signal can be output from the display 180.

The image decoder 325 can include a decoder of various standards. For example, a 3D image decoder for MPEG-2, H.264 decoder, a color image, and a depth image, and a decoder for a multiple view image may be provided.

The scaler 335 may scale an input image signal decoded by the image decoder 325 or the like.

For example, if the size or resolution of an input image signal is small, the scaler 335 may upscale the input image signal, and, if the size or resolution of the input image signal is great, the scaler 335 may downscale the input image signal.

The image quality processor 635 may perform image quality processing on an input image signal decoded by the image decoder 325 or the like.

For example, the image quality processor 625 may perform noise reduction processing on an input image signal, extend a resolution of high gray level of the input image signal, perform image resolution enhancement, perform high dynamic range (HDR)-based signal processing, change a frame rate, perform image quality processing suitable for properties of a panel, especially an OLED panel, etc.

The graphic processor 340 generates an OSD signal based on a user input or by itself. For example, based on a user input signal, the graphic processor 340 may generate a signal for displaying various information as a graphic or a text on the screen of the display 180. The generated OSD signal may include various data such as a user interface screen of the image display apparatus 100, various menu screens, a widget, and an icon. In addition, the generated OSD signal may include a 2D object or a 3D object.

In addition, the graphic processor 340 may generate a pointer that can be displayed on the display, based on a pointing signal input from the remote controller 200. In particular, such a pointer may be generated by a pointing signal processor, and the graphic processor 340 may include such a pointing signal processor (not shown). Obviously, the pointing signal processor (not shown) may be provided separately from the graphic processor 340.

The Frame Rate Converter (FRC) 350 may convert a frame rate of the input image. The frame rate converter 350 may output the image as it is without separate frame rate conversion.

Meanwhile, the formatter 360 may change a format of an input image signal into a format suitable for displaying the image signal on a display and output the image signal in the changed format.

In particular, the formatter 360 may change a format of an image signal to correspond to a display panel.

Meanwhile, the formatter 360 may change the format of the image signal. For example, it may change the format of the 3D image signal into any one of various 3D formats such as a side by side format, a top/down format, a frame sequential format, an interlaced format, a checker box format, and the like.

The processor 330 may control overall operations of the image display apparatus 100 or the signal processor 170.

For example, the processor 330 may control the tuner 110 to control the tuning of an RF broadcast corresponding to a channel selected by a user or a previously stored channel.

In addition, the processor 330 may control the image display apparatus 100 based on a user command input through the user input interface 150 or an internal program.

In addition, the processor 330 may transmit data to the network interface 135 or to the external apparatus interface 130.

In addition, the processor 330 may control the demultiplexer 310, the image processor 320, and the like in the signal processor 170.

Meanwhile, the audio processor 370 in the signal processor 170 may perform the audio processing of the demultiplexed audio signal. To this end, the audio processor 370 may include various decoders.

In addition, the audio processor 370 in the signal processor 170 may process a base, a treble, a volume control, and the like.

The data processor (not shown) in the signal processor 170 may perform data processing of the demultiplexed data signal. For example, when the demultiplexed data signal is a coded data signal, it can be decoded. The encoded data signal may be electronic program guide information including broadcast information such as a start time and an end time of a broadcast program broadcasted on each channel.

Meanwhile, a block diagram of the signal processor 170 shown in FIG. 3 is a block diagram for an embodiment of the present disclosure. Each component of the block diagram may be integrated, added, or omitted according to a specification of the signal processor 170 actually implemented.

In particular, the frame rate converter 350 and the formatter 360 may be provided separately in addition to the image processor 320.

Figure 4A:
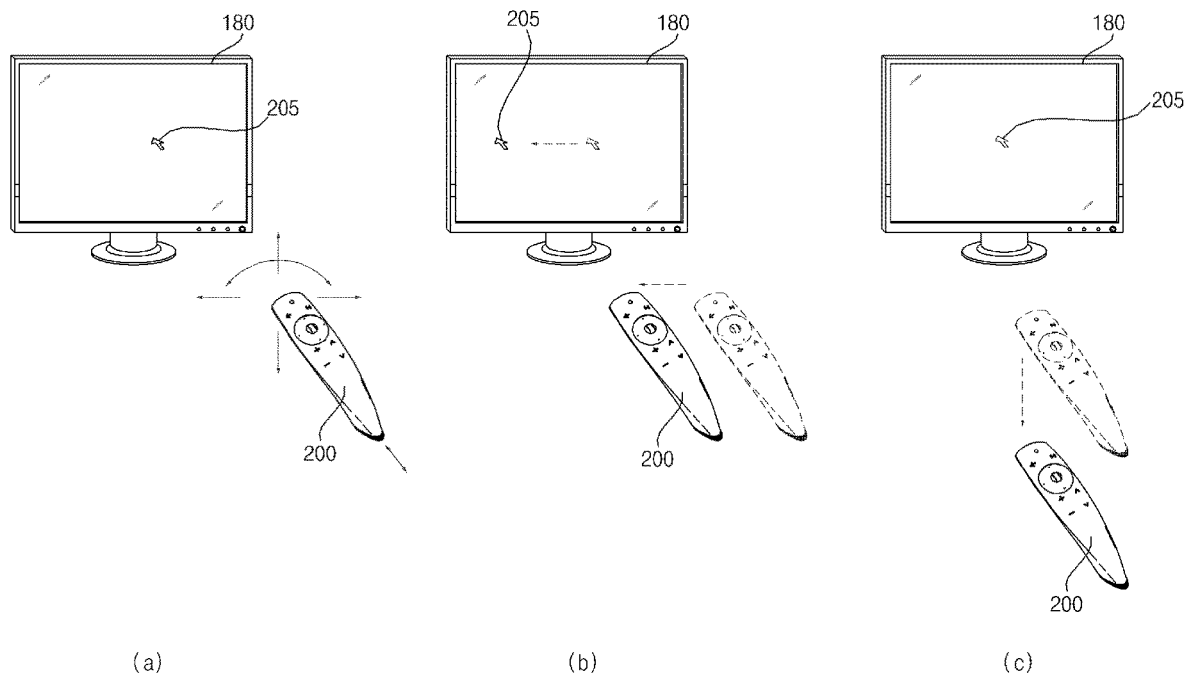
FIG. 4A is a diagram illustrating a control method of a remote controller of FIG. 2.

FIG. 4A is a diagram illustrating a control method of a remote controller of FIG. 2.

As shown in FIG. 4A(a), it is illustrated that a pointer 205 corresponding to the remote controller 200 is displayed on the display 180.

The user may move or rotate the remote controller 200 up and down, left and right (FIG. 4A(b)), and back and forth (FIG. 4A(c)). The pointer 205 displayed on the display 180 of the image display apparatus corresponds to the motion of the remote controller 200. Such a remote controller 200 may be referred to as a space remote controller or a 3D pointing apparatus, because the pointer 205 is moved and displayed according to the movement in a 3D space, as shown in the drawing.

FIG. 4A(b) illustrates that when the user moves the remote controller 200 to the left, the pointer 205 displayed on the display 180 of the image display apparatus also moves to the left correspondingly.

Information on the motion of the remote controller 200 detected through a sensor of the remote controller 200 is transmitted to the image display apparatus. The image display apparatus may calculate the coordinate of the pointer 205 from the information on the motion of the remote controller 200. The image display apparatus may display the pointer 205 to correspond to the calculated coordinate.

FIG. 4A(c) illustrates a case where the user moves the remote controller 200 away from the display 180 while pressing a specific button of the remote controller 200. Thus, a selection area within the display 180 corresponding to the pointer 205 may be zoomed in so that it can be displayed to be enlarged. On the other hand, when the user moves the remote controller 200 close to the display 180, the selection area within the display 180 corresponding to the pointer 205 may be zoomed out so that it can be displayed to be reduced. Meanwhile, when the remote controller 200 moves away from the display 180, the selection area may be zoomed out, and when the remote controller 200 approaches the display 180, the selection area may be zoomed in.

Meanwhile, when the specific button of the remote controller 200 is pressed, it is possible to exclude the recognition of vertical and lateral movement. That is, when the remote controller 200 moves away from or approaches the display 180, the up, down, left, and right movements are not recognized, and only the forward and backward movements are recognized. Only the pointer 205 is moved according to the up, down, left, and right movements of the remote controller 200 in a state where the specific button of the remote controller 200 is not pressed.

Meanwhile, the moving speed or the moving direction of the pointer 205 may correspond to the moving speed or the moving direction of the remote controller 200.

Figure 4B:
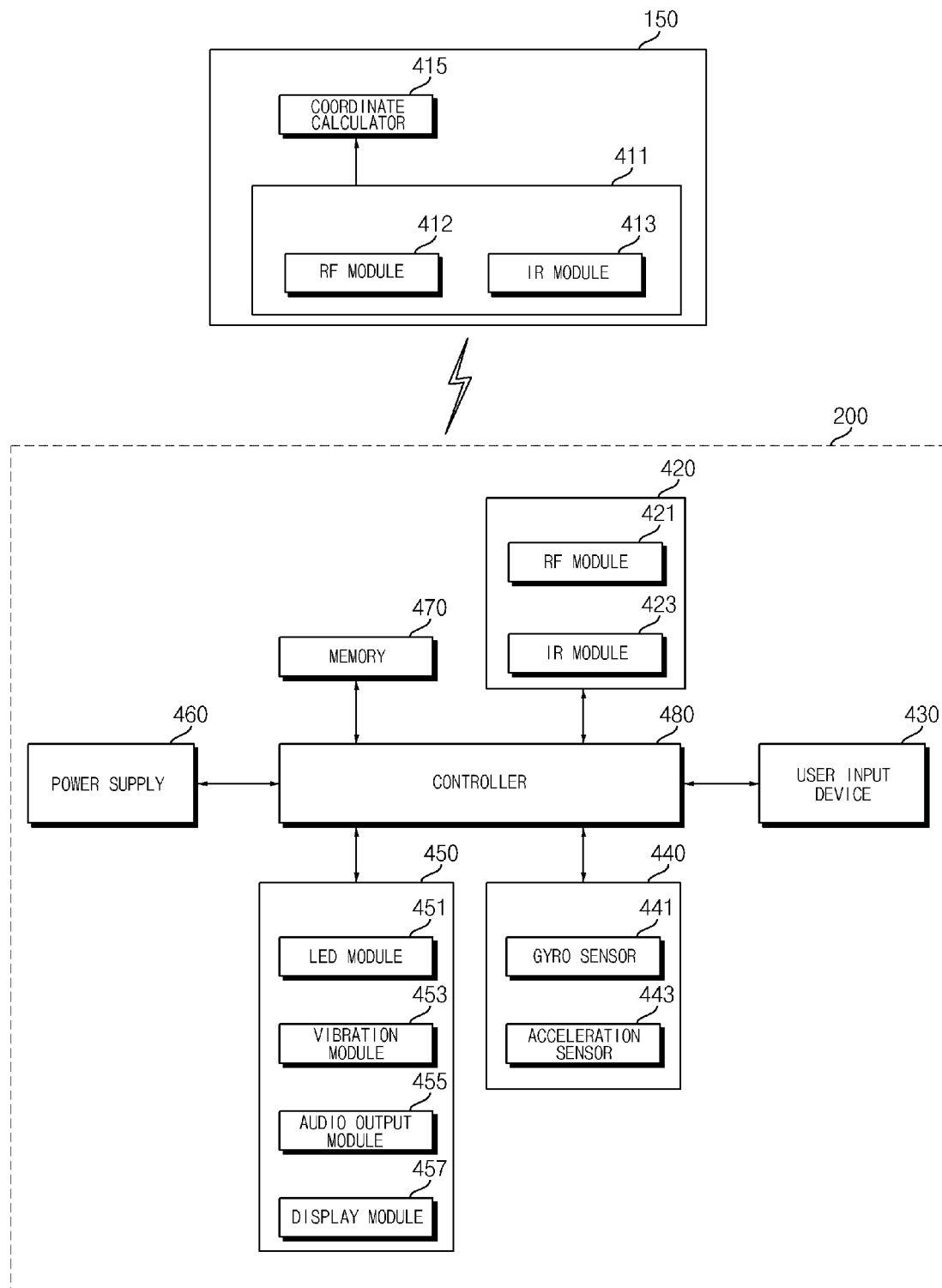
FIG. 4B is an internal block diagram of the remote controller of FIG. 2.

FIG. 4B is an internal block diagram of the remote controller of FIG. 2.

Referring to the drawing, the remote controller 200 includes a wireless transceiver 425, a user input device 430, a sensor device 440, an output device 450, a power supply 460, a memory 470, and a controller 480.

The wireless transceiver 425 transmits/receives a signal to/from any one of the image display apparatuses according to the embodiments of the present disclosure described above. Among the image display apparatuses according to the embodiments of the present disclosure, one image display apparatus 100 will be described as an example.

In this embodiment, the remote controller 200 may include an RF module 421 for transmitting and receiving signals to and from the image display apparatus 100 according to a RF communication standard. In addition, the remote controller 200 may include an IR module 423 for transmitting and receiving signals to and from the image display apparatus 100 according to an IR communication standard.

In this embodiment, the remote controller 200 transmits a signal containing information on the motion of the remote controller 200 to the image display apparatus 100 through the RF module 421.

In addition, the remote controller 200 may receive the signal transmitted by the image display apparatus 100 through the RF module 421. In addition, if necessary, the remote controller 200 may transmit a command related to power on/off, channel change, volume change, and the like to the image display apparatus 100 through the IR module 423.

The user input device 430 may be implemented by a keypad, a button, a touch pad, a touch screen, or the like. The user may operate the user input device 430 to input a command related to the image display apparatus 100 to the remote controller 200. When the user input device 430 includes a hard key button, the user can input a command related to the image display apparatus 100 to the remote controller 200 through a push operation of the hard key button. When the user input device 430 includes a touch screen, the user may touch a soft key of the touch screen to input the command related to the image display apparatus 100 to the remote controller 200. In addition, the user input device 430 may include various types of input means such as a scroll key, a jog key, etc., which can be operated by the user, and the present disclosure does not limit the scope of the present disclosure.

The sensor device 440 may include a gyro sensor 441 or an acceleration sensor 443. The gyro sensor 441 may sense information about the motion of the remote controller 200.

For example, the gyro sensor 441 may sense information on the operation of the remote controller 200 based on the x, y, and z axes. The acceleration sensor 443 may sense information on the moving speed of the remote controller 200. Meanwhile, a distance measuring sensor may be further provided, and thus, the distance to the display 180 may be sensed.

The output device 450 may output an image or an audio signal corresponding to the operation of the user input device 430 or a signal transmitted from the image display apparatus 100. Through the output device 450, the user may recognize whether the user input device 430 is operated or whether the image display apparatus 100 is controlled.

For example, the output device 450 may include an LED module 451 that is turned on when the user input device 430 is operated or a signal is transmitted/received to/from the image display apparatus 100 through the wireless transceiver 425, a vibration module 453 for generating a vibration, an audio output module 455 for outputting an audio, or a display module 457 for outputting an image.

The power supply 460 supplies power to the remote controller 200. When the remote controller 200 is not moved for a certain time, the power supply 460 may stop the supply of power to reduce a power waste. The power supply 460 may resume power supply when a certain key provided in the remote controller 200 is operated.

The memory 470 may store various types of programs, application data, and the like necessary for the control or operation of the remote controller 200. If the remote controller 200 wirelessly transmits and receives a signal to/from the image display apparatus 100 through the RF module 421, the remote controller 200 and the image display apparatus 100 transmit and receive a signal through a certain frequency band. The controller 480 of the remote controller 200 may store information about a frequency band or the like for wirelessly transmitting and receiving a signal to/from the image display apparatus 100 paired with the remote controller 200 in the memory 470 and may refer to the stored information.

The controller 480 controls various matters related to the control of the remote controller 200. The controller 480 may transmit a signal corresponding to a certain key operation of the user input device 430 or a signal corresponding to the motion of the remote controller 200 sensed by the sensor device 440 to the image display apparatus 100 through the wireless transceiver 425.

The user input interface 150 of the image display apparatus 100 includes a wireless transceiver 151 that can wirelessly transmit and receive a signal to and from the remote controller 200 and a coordinate value calculator 415 that can calculate the coordinate value of a pointer corresponding to the operation of the remote controller 200.

The user input interface 150 may wirelessly transmit and receive a signal to and from the remote controller 200 through the RF module 412. In addition, the user input interface 150 may receive a signal transmitted by the remote controller 200 through the IR module 413 according to a IR communication standard.

The coordinate value calculator 415 may correct a hand shake or an error from a signal corresponding to the operation of the remote controller 200 received through the wireless transceiver 151 and calculate the coordinate value (x, y) of the pointer 205 to be displayed on the display 180.

The transmission signal of the remote controller 200 inputted to the image display apparatus 100 through the user input interface 150 is transmitted to the controller 180 of the image display apparatus 100. The controller 180 may determine the information on the operation of the remote controller 200 and the key operation from the signal transmitted from the remote controller 200, and, correspondingly, control the image display apparatus 100.

In another example, the remote controller 200 may calculate the pointer coordinate value corresponding to the operation and output it to the user input interface 150 of the image display apparatus 100. In this case, the user input interface 150 of the image display apparatus 100 may transmit information on the received pointer coordinate value to the controller 180 without a separate correction process of hand shake or error.

In another example, unlike the drawing, the coordinate value calculator 415 may be provided in the signal processor 170, not in the user input interface 150.

Figure 5:
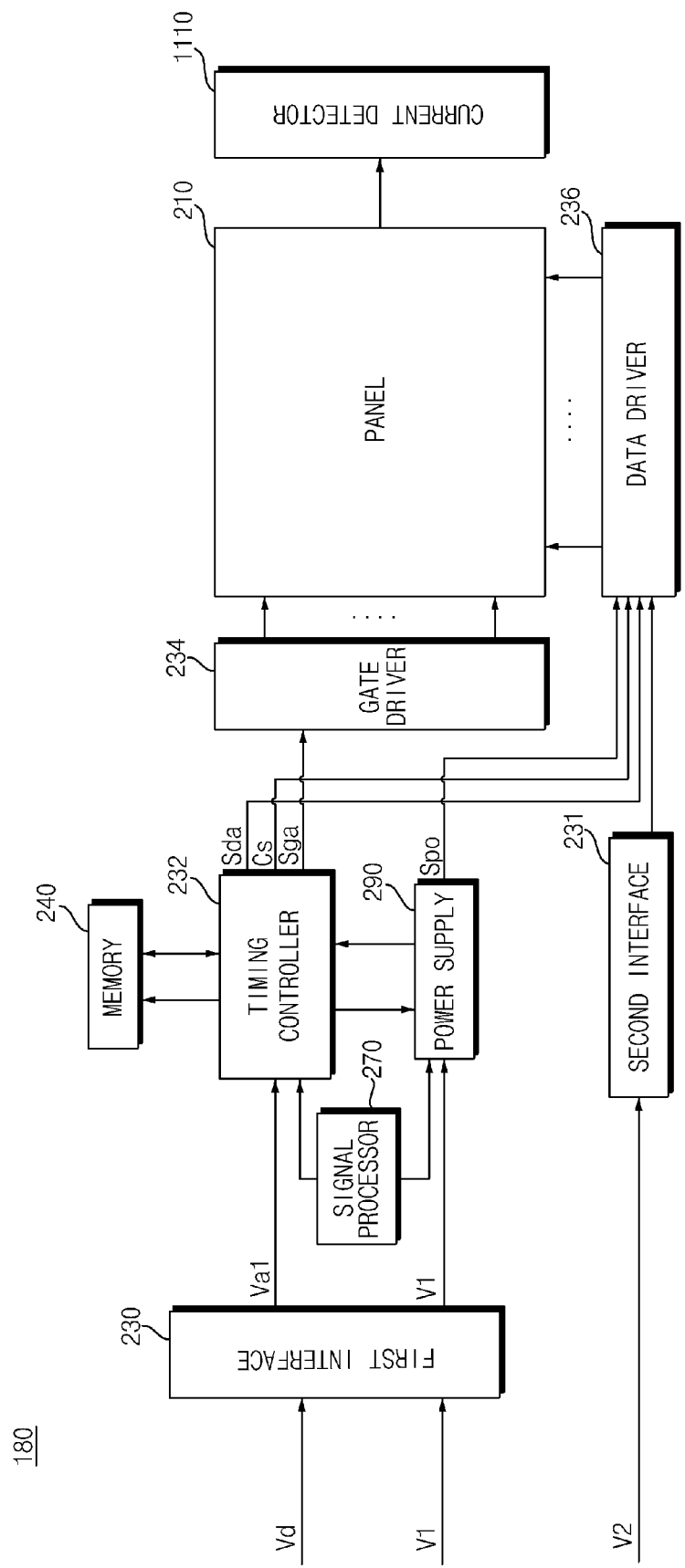
FIG. 5 is an internal block diagram of a display of FIG. 2.

FIG. 5 is an internal block diagram of a display of FIG. 2.

Referring to FIG. 5, the organic light emitting diode panel-based display 180 may include an organic light emitting diode panel 210, a first interface 230, a second interface 231, a timing controller 232, a gate driver 234, a data driver 236, a memory 240, a signal processor 270, a power supply 290, a current detector 510, and the like.

The display 180 receives an image signal Vd, a first DC power V1, and a second DC power V2, and may display a certain image based on the image signal Vd.

Meanwhile, the first interface 230 in the display 180 may receive the image signal Vd and the first DC power V1 from the signal processor 170.

Here, the first DC power V1 may be used for the operation of the power supply 290 and the timing controller 232 in the display 180.

Next, the second interface 231 may receive a second DC power V2 from an external power supply 190. Meanwhile, the second DC power V2 may be input to the data driver 236 in the display 180.

The timing controller 232 may output a data driving signal Sda and a gate driving signal Sga, based on the image signal Vd.

For example, when the first interface 230 converts the input image signal Vd and outputs the converted image signal va1, the timing controller 232 may output the data driving signal Sda and the gate driving signal Sga based on the converted image signal va1.

The timing controller 232 may further receive a control signal, a vertical synchronization signal Vsync, and the like, in addition to the image signal Vd from the signal processor 170.

In addition to the image signal Vd, based on a control signal, a vertical synchronization signal Vsync, and the like, the timing controller 232 generates a gate driving signal Sga for the operation of the gate driver 234, and a data driving signal Sda for the operation of the data driver 236.

Meanwhile, the timing controller 232 may further output a control signal Cs to the gate driver 234.

The gate driver 234 and the data driver 236 supply a scan signal and an image signal to the organic light emitting diode panel 210 through a gate line GL and a data line DL respectively, according to the gate driving signal Sga and the data driving signal Sda from the timing controller 232. Accordingly, the organic light emitting diode panel 210 displays a certain image.

Meanwhile, the organic light emitting diode panel 210 may include an organic light emitting layer. In order to display an image, a plurality of gate lines GL and data lines DL may be disposed in a matrix form in each pixel corresponding to the organic light emitting layer.

Meanwhile, the data driver 236 may output a data signal to the organic light emitting diode panel 210 based on a second DC power V2 from the second interface 231.

The power supply 290 may supply various power supplies to the gate driver 234, the data driver 236, the timing controller 232, and the like.

The current detector 510 may detect the current flowing in a sub-pixel of the organic light emitting diode panel 210. The detected current may be input to the signal processor 270 or the like, for a cumulative current calculation.

The signal processor 270 may perform each type of control of the display 180. For example, the signal processor 270 may control the gate driver 234, the data driver 236, the timing controller 232, and the like.

Meanwhile, the signal processor 270 may receive current information flowing in a sub-pixel of the organic light emitting diode panel 210 from the current detector 510.

In addition, the signal processor 270 may calculate the accumulated current of each subpixel of the organic light emitting diode panel 210, based on information of current flowing through the subpixel of the organic light emitting diode panel 210. The calculated accumulated current may be stored in the memory 240.

Meanwhile, the signal processor 270 may determine as burn-in, if the accumulated current of each sub-pixel of the organic light emitting diode panel 210 is equal to or greater than an allowable value.

For example, if the accumulated current of each subpixel of the OLED panel 210 is equal to or higher than 300000 A, the signal processor 270 may determine that a corresponding subpixel is a burn-in subpixel.

Meanwhile, if the accumulated current of each subpixel of the OLED panel 210 is close to an allowable value, the signal processor 270 may determine that a corresponding subpixel is a subpixel expected to be burn in.

Meanwhile, based on a current detected by the current detector 510, the signal processor 270 may determine that a subpixel having the greatest accumulated current is an expected burn-in subpixel.

Meanwhile, based on a current detected by the current detector 1110, the signal processor 270 may calculate a burn-in subpixel or an expected burn-in subpixel of the OLED panel 210, and may control a current, lower than an assigned current, to flow through subpixels adjacent to the calculated burn-in subpixel or expected burn-in subpixel, thereby extending burn-in of sub-pixels adjacent to the burn-in subpixel. Accordingly, it is possible to reduce afterimage of the image display apparatus 100 including the OLED panel 210.

Meanwhile, the signal processor 270 may control a current, higher than the assigned current, to flow through the calculated burn-in subpixel, such that a low current may flow through the subpixels adjacent to the calculated burn-in subpixel, thereby preventing a phenomenon of reduced brightness.

Meanwhile, if no burn-in occurs in the OLED panel 210, the signal processor 270 may control a current, lower than the assigned current, to flow through subpixels adjacent to the expected burn-in subpixel which is expected to burn in, thereby extending burn-in of sub-pixels adjacent to the expected burn-in subpixel. Accordingly, it is possible to reduce afterimage of the image display apparatus 100 including the OLED panel 210.

Meanwhile, the signal processor 270 may control a data voltage, lower than an assigned data voltage, to be applied to subpixels adjacent to the calculated burn-in subpixel or expected burn-in subpixel.

Meanwhile, if no burn-in occurs in the OLED panel 210, the signal processor 270 may also control a current, lower than the assigned current, to flow through the expected burn-in subpixel which is expected to burn in, thereby extending burn-in of the expected burn-in subpixel. Accordingly, it is possible to reduce afterimage of the image display apparatus 100 including the OLED panel 210.

Meanwhile, the signal processor 270 may control a current having a second level, higher than a first level, to flow through a second subpixel located further than a first subpixel among subpixels adjacent to the calculated burn-in subpixel or expected burn-in subpixel, such that by controlling a higher current to flow through the second subpixel which is expected to have a longer lifespan, it is possible to prevent a phenomenon of reduced brightness.

Meanwhile, the signal processor 270 may calculate a subpixel, having the greatest accumulated current in the OLED panel 210, based on a current detected by the current detector 1110, and may control a current, lower than the assigned current, to flow through subpixels adjacent to the subpixel having the greatest accumulated current, thereby reducing afterimage of the image display apparatus 100 including the OLED panel 210.

Meanwhile, the signal processor 270 may control a lower current to flow through subpixels located closer to the subpixel having the greatest accumulated current, thereby reducing afterimage of the image display apparatus 100 including the OLED panel 210.

The operation of the signal processor 270 and the like will be described in further detail below with reference to FIG. 10 and the following figures.

Figure 6A:
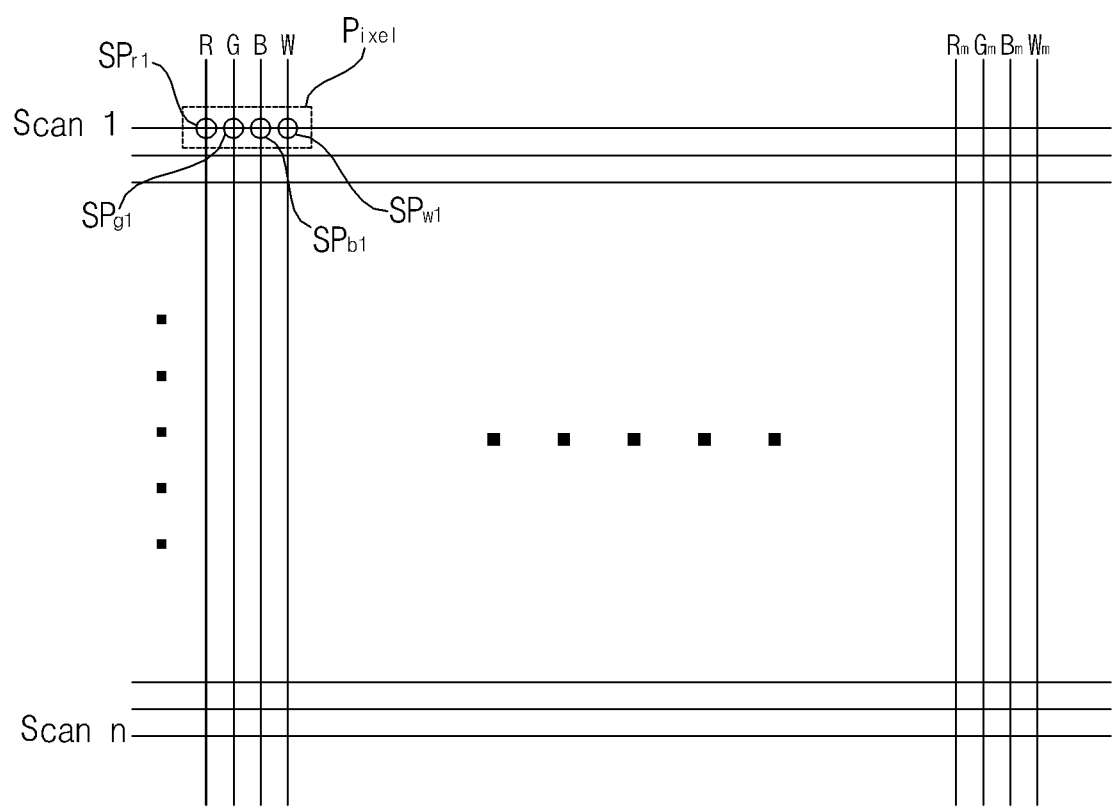
FIGS. 6A and 6B are diagrams referred to in the description of an organic light emitting diode panel of FIG. 5.
Figure 6B:
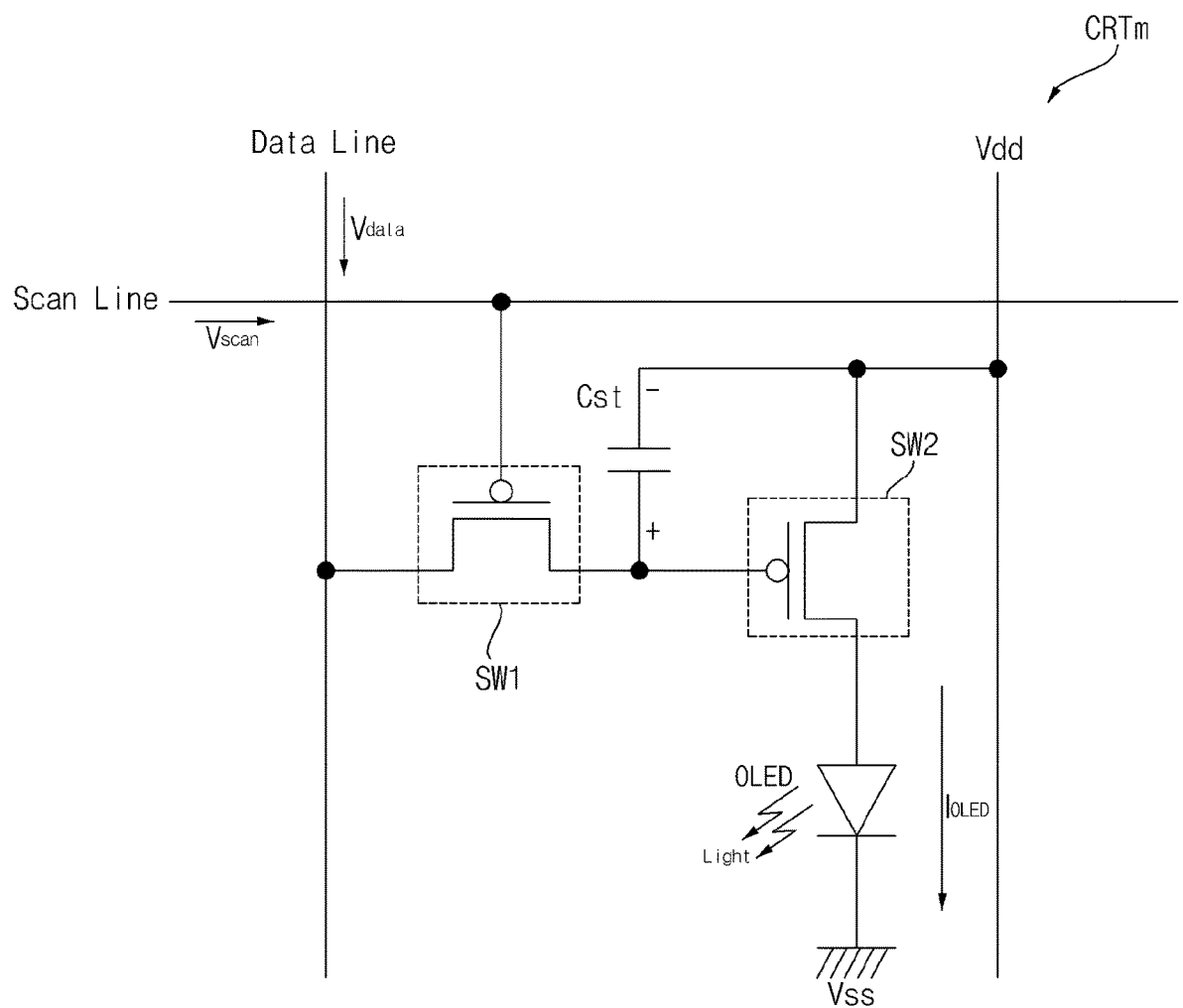

FIG. 6A and FIG. 6B are diagrams referred to in the description of an organic light emitting diode panel of FIG. 5.

Firstly, FIG. 6A is a diagram illustrating a pixel in the organic light emitting diode panel 210.

Referring to drawing, the organic light emitting diode panel 210 may include a plurality of scan lines Scan1 to Scann and a plurality of data lines R1, G1, B1, W1 to Rm, Gm, Bm, Wm intersecting the scan lines.

Meanwhile, a pixel (subpixel) is defined in an intersecting area of the scan line and the data line in the organic light emitting diode panel 210. In the drawing, a pixel including sub-pixels SR1, SG1, SB1 and SW1 of RGBW is shown.

FIG. 6B illustrates a circuit of any one sub-pixel in the pixel of the organic light emitting diode panel of FIG. 6A.

Referring to drawing, an organic light emitting sub pixel circuit (CRT) may include, as an active type, a scan transistor SW1, a storage capacitor Cst, a drive transistor SW2, and an organic light emitting layer (OLED).

The scan transistor SW1 is turned on according to the input scan signal Vdscan, as a scan line is connected to a gate terminal. When it is turned on, the input data signal Vdata is transferred to the gate terminal of a drive transistor SW2 or one end of the storage capacitor Cst.

The storage capacitor Cst is formed between the gate terminal and the source terminal of the drive transistor SW2, and stores a certain difference between a data signal level transmitted to one end of the storage capacitor Cst and a DC power (VDD) level transmitted to the other terminal of the storage capacitor Cst.

For example, when the data signal has a different level according to a Plume Amplitude Modulation (PAM) method, the power level stored in the storage capacitor Cst varies according to the level difference of the data signal Vdata.

In another example, when the data signal has a different pulse width according to a Pluse Width Modulation (PWM) method, the power level stored in the storage capacitor Cst varies according to the pulse width difference of the data signal Vdata.

The drive transistor SW2 is turned on according to the power level stored in the storage capacitor Cst. When the drive transistor SW2 is turned on, the driving current (IOLED), which is proportional to the stored power level, flows in the organic light emitting layer (OLED). Accordingly, the organic light emitting layer OLED performs a light emitting operation.

The organic light emitting layer OLED may include a light emitting layer (EML) of RGBW corresponding to a subpixel, and may include at least one of a hole injecting layer (HIL), a hole transporting layer (HTL), an electron transporting layer (ETL), or an electron injecting layer (EIL). In addition, it may include a hole blocking layer, and the like.

Meanwhile, all the subpixels emit a white light in the organic light emitting layer OLED. However, in the case of green, red, and blue subpixels, a subpixel is provided with a separate color filter for color implementation. That is, in the case of green, red, and blue subpixels, each of the subpixels further includes green, red, and blue color filters. Meanwhile, since a white subpixel outputs a white light, a separate color filter is not required.

Meanwhile, in the drawing, it is illustrated that a p-type MOSFET is used for a scan transistor SW1 and a drive transistor SW2, but an n-type MOSFET or other switching element such as a JFET, IGBT, SIC, or the like are also available.

Meanwhile, the pixel is a hold-type element that continuously emits light in the organic light emitting layer (OLED), after a scan signal is applied, during a unit display period, specifically, during a unit frame.

Figure 7:
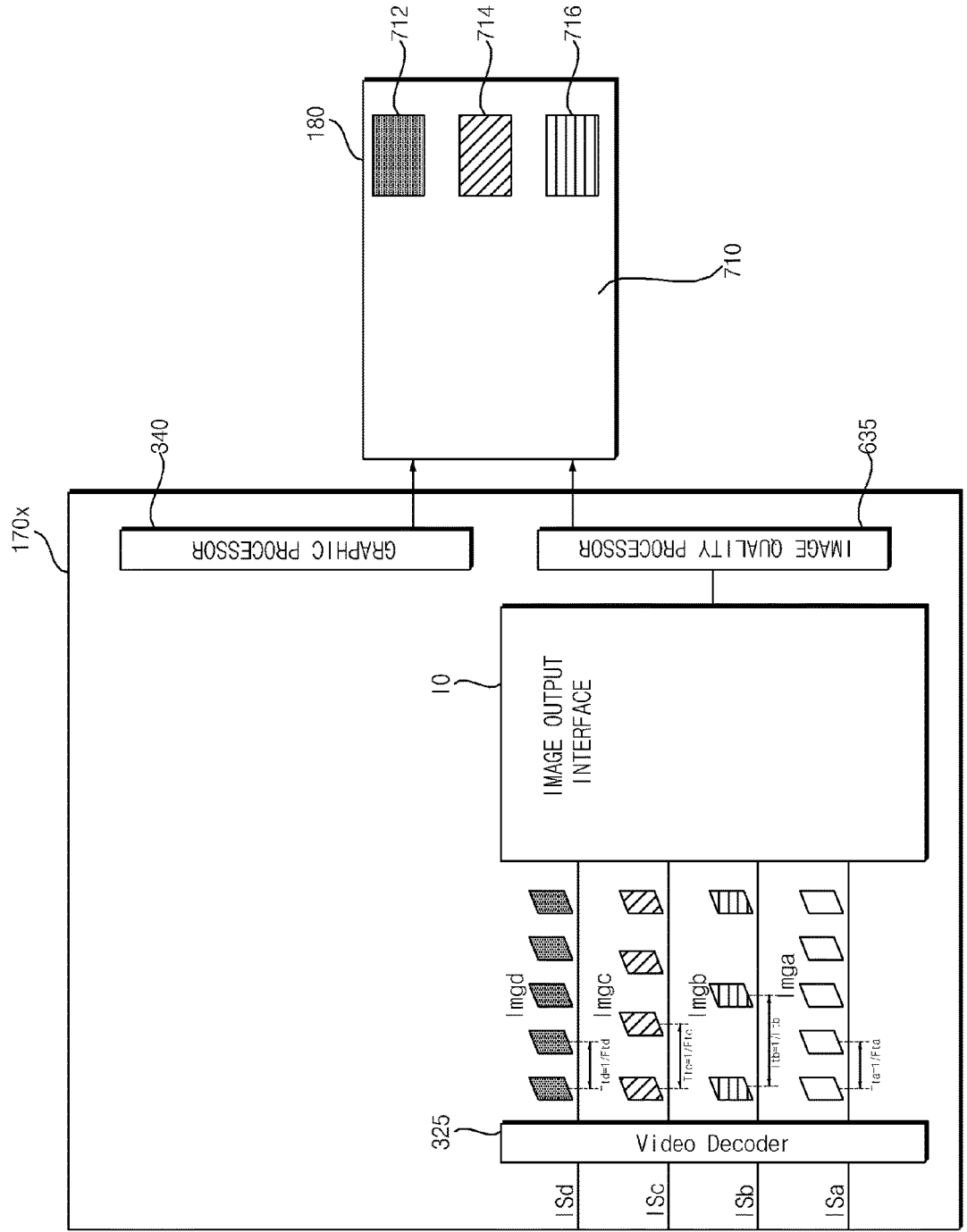
FIGS. 7 and 8 are various examples of an internal block diagram of a signal processing device associated with the present disclosure.
Figure 8:
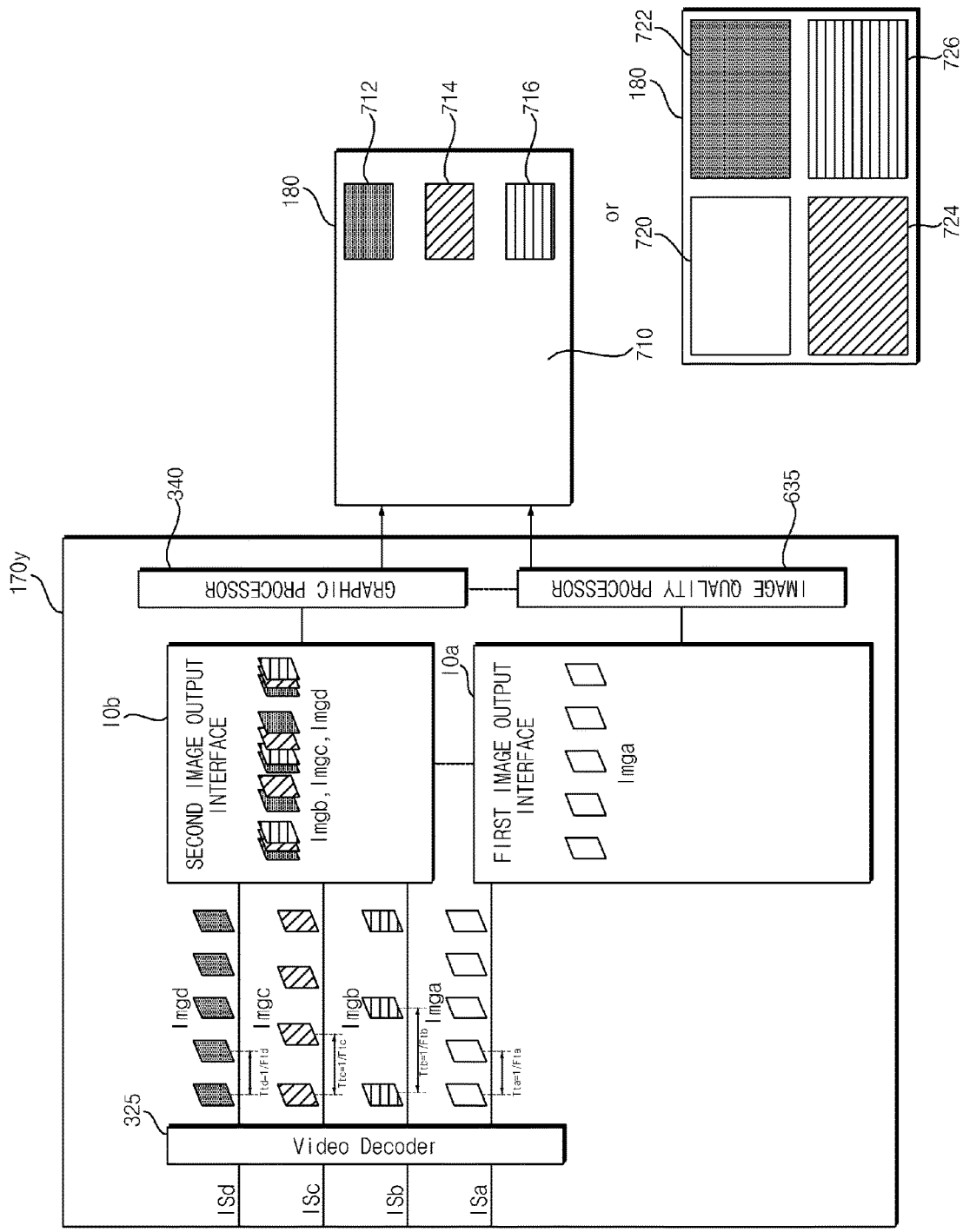

FIGS. 7 and 8 are various examples of an internal block diagram of a signal processing device associated with the present disclosure.

First, FIG. 7 is an example of an internal block diagram of a signal processing device 170x associated with the present disclosure.

Referring to the drawing, the decoder 325 may decode a plurality of video data from a plurality of video sources ISa to ISd and may output the decoded video data.

In this case, frame periods of the respective video data Imga to Imgd from the plurality of video sources ISa to ISd may be Tta, Ttb, Ttc, and Ttd, and thus frame rates of the respective video data Imga to Imgd from the plurality of video sources ISa to ISd may be Fta, Ftb, Ftc, and Ftd.

Meanwhile, the graphic processor 340 in the signal processing device 170x may be used for generating and processing the OSD signal.

Meanwhile, the image output interface 10 in the signal processing device 170x may receive the plurality of video data Imga to Imgd having different frame rates, and may perform signal processing on the video data and output the respective video data Imga to Imgd.

In addition, the image quality processor 635 may perform rendering of the plurality of video data Imga to Imgd and may output image data corresponding to the plurality of video data Imga to Imgd.

Accordingly, a main image 710 corresponding to the first video data Imga, and a plurality of sub-images 712, 714, and 716 corresponding to the second to fourth video data Imgb to Imgd may be displayed on one screen of the display 180.

Meanwhile, the image quality processor 635 in the signal processing device 170x is in charge of signal processing of the plurality of video data Imga to Imgb, such that the burden on the image quality processor 635 increases.

Next, FIG. 8 is another example of an internal block diagram of a signal processing device 170y associated with the present disclosure.

Referring to the drawing, the signal processing device 170y of FIG. 8 is similar to the signal processing device 170x of FIG. 7, but is different in that unlike the signal processing device 170x, the signal processing device 170y of FIG. 8 further includes the first image output interface 10a and the second image output interface 10b.

That is, in the signal processing device 170y of FIG. 8, the first image output interface 10a and the second image output interface 10b share the burden of signal processing of the plurality of video data Imga to Imgd, and the graphic processor 340 performs rendering of the second to fourth video data Imgb to Imgd.

Referring to the drawing, the decoder 325 may decode the plurality of video data from the plurality of video sources ISa to ISd, and may output the decoded video data.

In this case, frame periods of the respective video data Imga to Imgd from the plurality of video sources ISa to ISd may be Tta, Ttb, Ttc, and Ttd, and thus frame rates of the respective video data Imga to Imgd from the plurality of video sources ISa to ISd may be Fta, Ftb, Ftc, and Ftd.

The first image output interface 10a performs signal processing on the first video data Imga among the plurality of video data Imga to Imgd, and outputs the first video data Imga to the image quality processor 635.

The second image output interface 10b performs signal processing on the second to fourth video data Imgb to Imgd among the plurality of video data Imga to Imgd, and outputs the second to fourth video data Imgb to Imgd to the graphic processor 340.

In this case, the first image output interface 10a and the second image output interface 10b operate without being synchronized with each other.

Accordingly, the image quality processor 635 may perform rendering of the first video data Imga to output the rendered first video data Imga based on the first frame rate Fta, and the graphic processor 340 may perform rendering of the second to fourth video data Imgb to Imgd to output the rendered second to fourth video data Imgb to Imgd based on the second to fourth frame rates Ftb, Ftc, and Ftd.

As a result, it is difficult to display the main image 710 and the sub-images 712, 714, and 716 on one screen of the display 180.

Further, it is difficult to display a plurality of images 720, 722, 724, and 726 of the same size on one screen of the display 180.

Accordingly, the present disclosure provides a method in which when the plurality of video data from the plurality of sources are displayed on one screen, the image quality processor 635 and the graphic processor 340 in the signal processing device 170 perform signal processing on the video data in a synchronized manner during processing of the video data, which will be described below with reference to FIG. 9 and the following figures.

Figure 9:
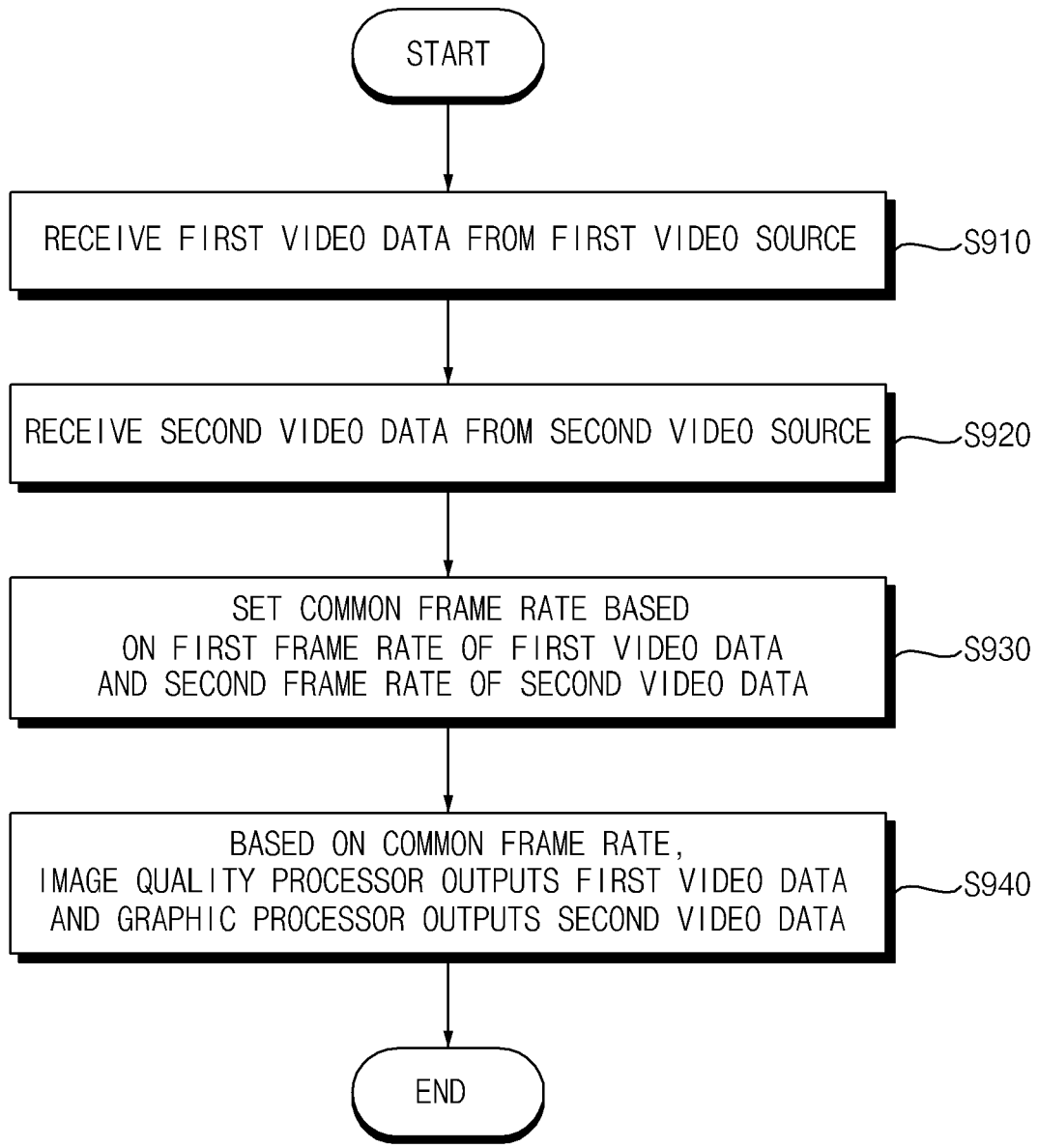
FIG. 9 is a flowchart illustrating a method of operating a signal processing device according to an embodiment of the present disclosure.

FIG. 9 is a flowchart illustrating a method of operating a signal processing device according to an embodiment of the present disclosure.

Referring to the drawing, the signal processing device 170 receives the first video data Imga from the first video source ISa (S910) and receives the second video data Imgb from the second video source ISb (S920).

Accordingly, the decoder 325 in the signal processing device 170 decodes the first video data Imga received from the first video source ISa and the second video data Imgb received from the second video source ISb, and outputs the decoded first video data Imga and second video data Imgb.

Then, the first image output interface 10a or the second image output interface 10b sets the common frame rate Fts based on the first frame rate Fta of the first video data Imga and the second frame rate Ftb of the second video data Imgb (S930).

By setting the common frame rate Fts, the first output interface 10a and the second output interface 10b may operate in synchronization with each other.

For example, the first image output interface 10a or the second image output interface 10b may set, as the common frame rate Fts, a least common multiple of the first frame rate Fta of the first video data Imga and the second frame rate Ftb of the second video data Imgb.

Specifically, if the first frame rate Fta of the first video data Imga is 4 KHz, and the second frame rate Ftb of the second video data Imgb is 2 KHz, the first image output interface 10a or the second image output interface 10b may set 4 KHz, which is a least common multiple of the frame rates, as the common frame rate Fts. Accordingly, the common frame rate Fts may be set in a simple manner, and thus, the plurality of video data Imga and Imgb may be processed in a synchronized manner.

In another example, if the least common multiple of the first frame rate Fta of the first video data Imga and the second frame rate Ftb of the second video data Imgb is not obtained, the first image output interface 10a or the second image output interface 10b may set an approximate value as the common frame rate Fts.

Specifically, if the first frame rate Fta of the first video data Imga is 3.95 KHz, and the second frame rate Ftb of the second video data Imgb is 1.97 KHz, a least common multiple which is obtained is not an integer number, such that the first image output interface 10a or the second image output interface 10b may set 4 KHz, which is an approximate value of the least common multiple, as the common frame rate Fts. Accordingly, the common frame rate Fts may be set in a simple manner, and thus, the plurality of video data Imga and Imgb may be processed in a synchronized manner.

Next, based on the common frame rate Fts, the image quality processor 635 may output the first video data Imga by performing rendering and the graphic processor 340 may output the second video data Imgb by performing rendering (S940).

By setting the common frame rate Fts, the image quality processor 635 and the graphic processor 340 may operate in synchronization with each other.

Accordingly, images corresponding to the plurality of video data Imga and Imgb may be displayed stably on one screen of the display 180.

Accordingly, the plurality of video data Imga and Imgb may be processed in a synchronized manner. Particularly, even when synchronization information for the plurality of video data Imga and Imgb is erroneous, the plurality of video data may be processed in a synchronized manner based on the calculated common frame rate Fts.

Figure 10:
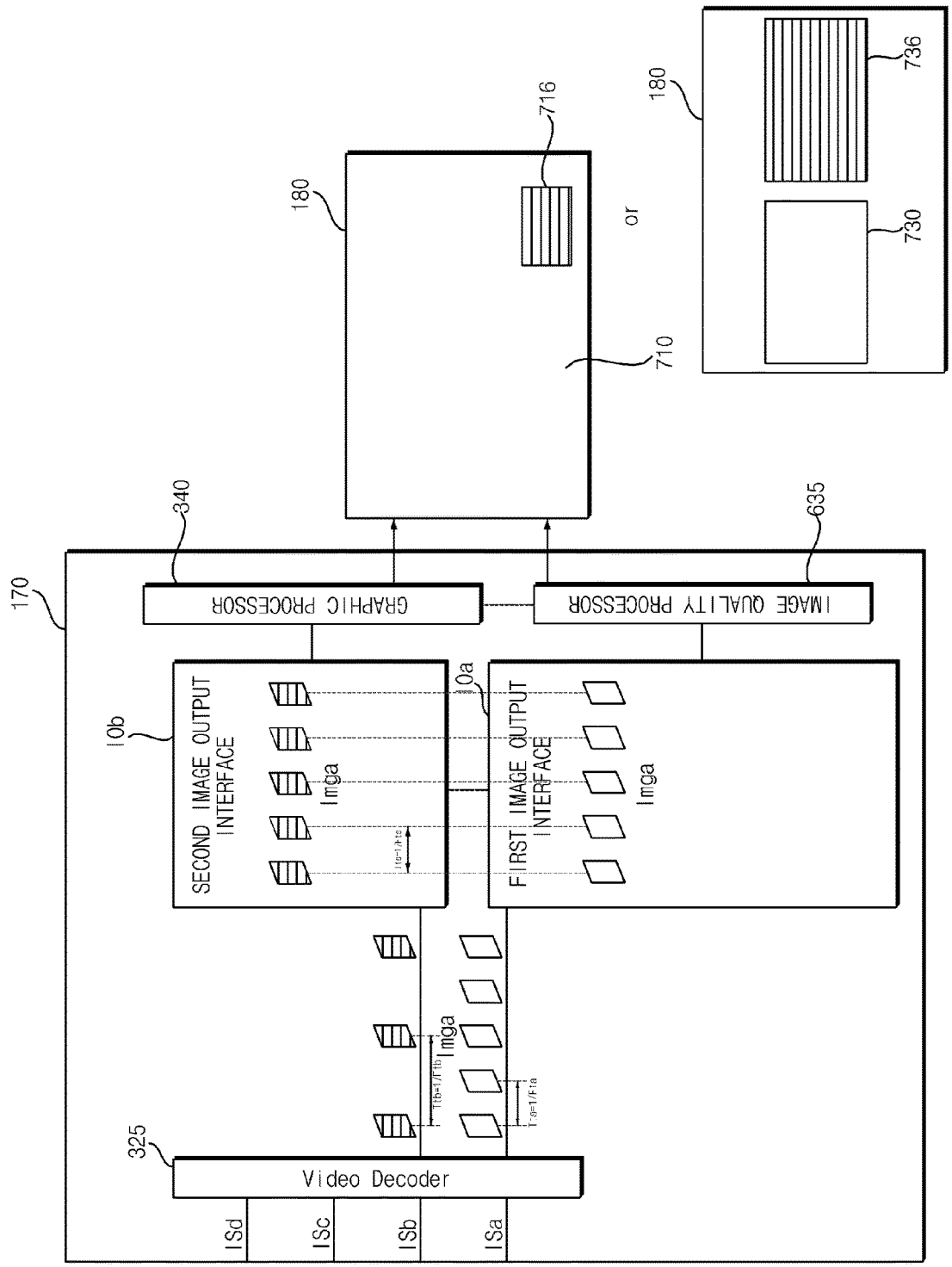
FIG. 10 is an example of an internal block diagram of a signal processing device according to an embodiment of the present disclosure.

FIG. 10 is an example of an internal block diagram of a signal processing device according to an embodiment of the present disclosure, and FIGS. 11A to 13 are diagrams referred to in the description of FIG. 10.

First, referring to FIG. 10, the signal processing device 170 according to an embodiment of the present disclosure may include the decoder 325, the image quality processor 635, and the graphic processor 340.

The decoder 325 may decode the first video data Imga from the first video source ISa and the second video data Imgb from the second video source ISb, and may output the decoded first video data Imga and second video data Imgb.

In the drawing, it is illustrated that the first video data Imga has a frame period of Tta and a frame rate of Fta, and the second video data Imgb has a frame period of Ttb and a frame rate of Ftb.

When the common frame rate Fts is set based on the first frame rate Fta of the first video data Imga and the second frame rate Ftb of the second video data Imgb, the image quality processor 635 may perform rendering of the first video data Imga to output the rendered first video data based on the common frame rate Fts.

The graphic processor 340 may perform rendering of the second video data Imgb to output the rendered second video data based on the common frame rate Fts.

As described above, by using the graphic processor 340 during processing of the plurality of video data, the plurality of video data may be processed in a synchronized manner, while reducing an operation burden on the image quality processor 635.

Accordingly, the plurality of video data is capable of being processed in a synchronized manner. Particularly, even when synchronization information for the plurality of video data is erroneous, the plurality of video data may be processed in a synchronized manner based on the calculated common frame rate Fts.

The signal processing device 170 according to an embodiment of the present disclosure may further include: the first image output interface 10a for outputting the first video data Imga to the image quality processor 635 based on the common frame rate Fts; and the second image output interface 10b for outputting the second video data Imgb to the graphic processor 340 based on the common frame rate Fts.

That is, the first image output interface 10a and the second image output interface 10b may operate in synchronization with each other based on the common frame rate Fts. Accordingly, by using the first image output interface 10a and the second image output interface 10b, the plurality of video data may be processed in a synchronized manner.

Meanwhile, the first image output interface 10a or the second image output interface 10b may set the common frame rate Fts based on the first frame rate Fta of the first video data Imga and the second frame rate Ftb of the second video data Imgb. Accordingly, the plurality of video data is capable of being processed in a synchronized manner.

Meanwhile, the first image output interface 10a or the second image output interface 10b may set, as the common frame rate Fts, a least common multiple of the first frame rate Fta of the first video data Imga and the second frame rate Ftb of the second video data Imgb.

Specifically, if the first frame rate Fta of the first video data Imga is 4 KHz, and the second frame rate Ftb of the second video data Imgb is 2 KHz, the first image output interface 10a or the second image output interface 10b may set 4 KHz, which is a least common multiple of the frame rates, as the common frame rate Fts. Accordingly, the common frame rate Fts may be set in a simple manner, and thus, the plurality of video data Imga and Imgb may be processed in a synchronized manner.

If the least common multiple of the first frame rate Fta of the first video data Imga and the second frame rate Ftb of the second video data Imgb is not obtained, the first image output interface 10a or the second image output interface 10b may set an approximate value as the least common multiple.

Specifically, if the first frame rate Fta of the first video data Imga is 3.95 KHz, and the second frame rate Ftb of the second video data Imgb is 1.97 KHz, a least common multiple which is obtained is not an integer number, such that the first image output interface 10a or the second image output interface 10b may set 4 KHz, which is an approximate value of the least common multiple, as the common frame rate Fts. Accordingly, the common frame rate Fts may be set in a simple manner, and thus, the plurality of video data Imga and Imgb may be processed in a synchronized manner.

Meanwhile, a size of the first video data Imga output by the image quality processor 635 may be greater than a size of the second video data Imgb output by the graphic processor 340.

As illustrated herein, when the first video data Imga output by the image quality processor 635 is the main image 170, and the second video data Imgb output by the graphic processor 340 is the sub-image 716, the main image 710 and the sub-image 176 may be displayed on one screen of the display 180. Accordingly, by using a single rendering channel, the plurality of video data Imga and Imgb may be processed in a synchronized manner.

Meanwhile, an image size of the first video data Imga output by the image quality processor 635 may be equal to an image size of the second video data Imgb output by the graphic processor 340, and a first image 730 and a second image 736 may be displayed side by side on one screen of the display 180.

Figure 11A:
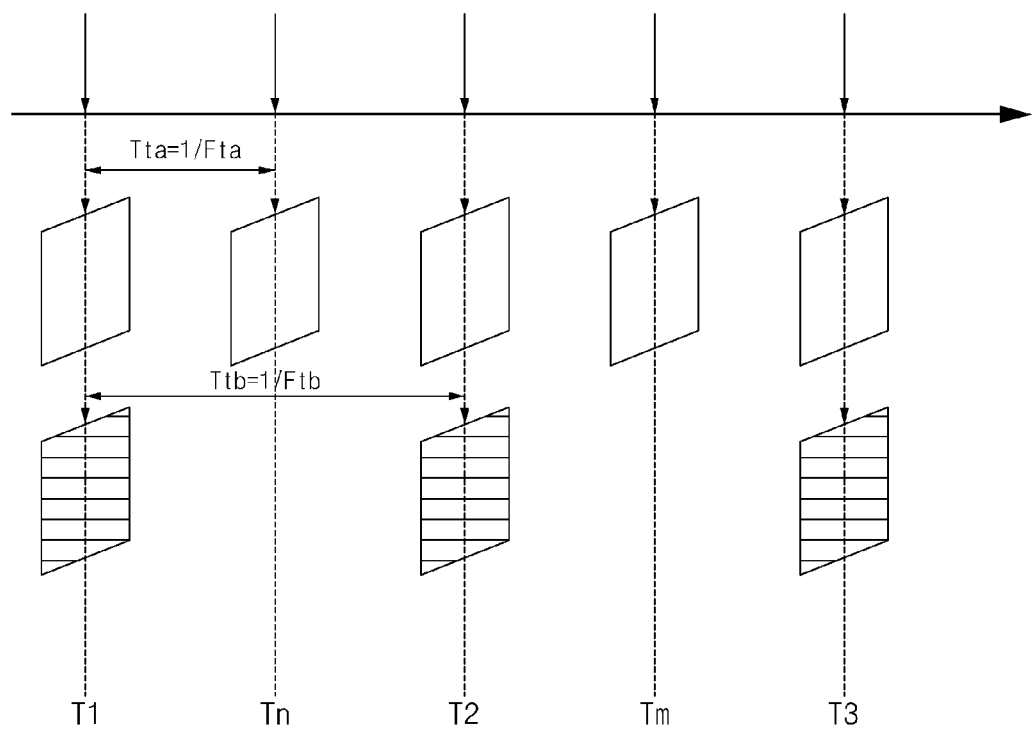
FIGS. 11A to 13 are diagrams referred to in the description of FIG. 10.

FIG. 11A is a diagram illustrating an example in which the first video data Imga has a frame period of Tta, and the second video data Imgb has a frame period of Ttb.

That is, the first video data Imga is output at time points T1, Tn, T2, Tm, and T3, and the second video data Imgb is output at time points T1, T2, and T3.

Meanwhile, the first image output interface 10a or the second image output interface 10b may set, as the common frame rate Fts, a least common multiple of the first frame rate Fta of the first video data Imga and the second frame rate Ftb of the second video data Imgb.

Figure 11B:
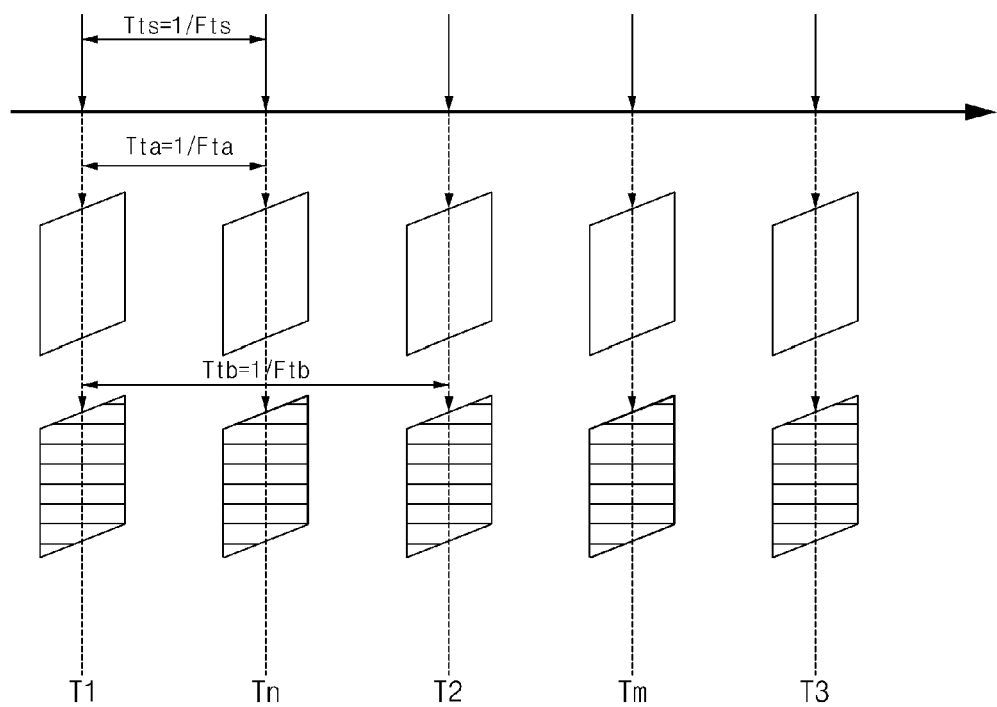

FIG. 11B is a diagram illustrating an example in which when the first video data Imga has a frame period of Tta, and the second video data Imgb has a frame period of Ttb, the common frame period is Tts.

That is, an example is illustrated in which the common frame rate Fts is an inverse number of the common frame period Ts.

Accordingly, the first image output interface 10a outputs the first video data Imga at time points T1, Tn, T2, Tm, and T3, and the second image output interface 10b outputs the second video data Imgb at time points T1, Tn, T2, Tm, and T3.

In comparison with FIG. 11A, the second video data Imgb is further output at time points Tn and Tm.

Accordingly, during rendering of the video data, the image quality processor 635 and the graphic processor 340 may output the first video data Imga and the second video data Imgb, respectively, at time points T1, Tn, T2, Tm, and T3.

Accordingly, the image quality processor 635 and the graphic processor 340 may operate in synchronization with the common frame rate Fts, a common frame period, or a common vertical synchronization signal, thereby processing the plurality of video data in a synchronized manner.

Figure 12:
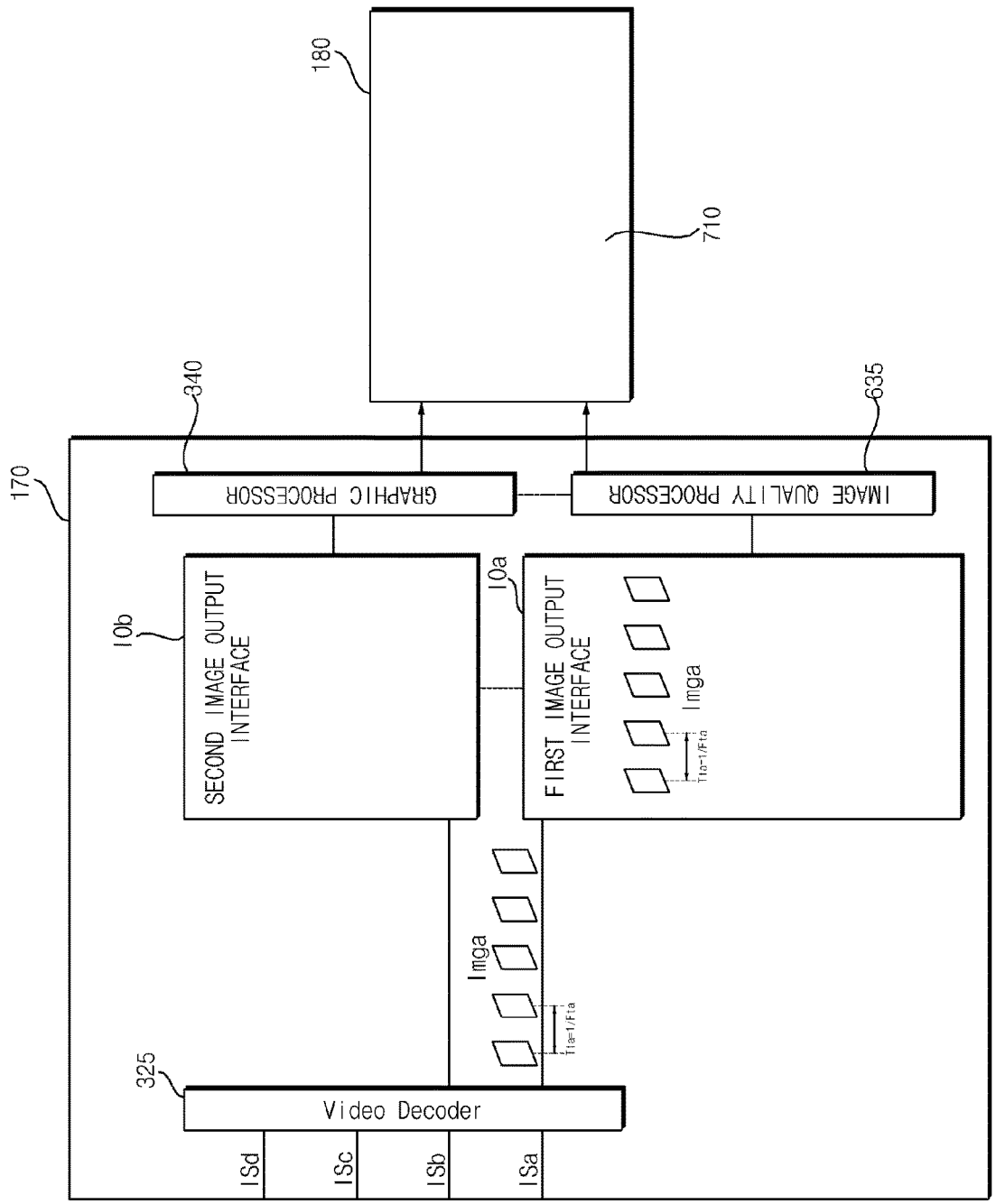

Meanwhile, in comparison with FIG. 10, FIG. 12 illustrates an example in which only the first video data Imga is input to the signal processing device 170.

Accordingly, the decoder 325 decodes only the first video data Imga, the first image output interface 10a performs signal processing based on the first frame rate Fta, and the image quality processor 635 performs rendering based on the first frame rate Fta, rather than the common frame rate.

Accordingly, only the image 710 based on the first video data Imga is displayed on the display 180.

That is, in comparison with FIG. 10, a frame rate for image display is reduced, and only one image is displayed on one screen.

Meanwhile, unlike FIGS. 10 to 12, the signal processing device 170 may receive and process the first to third video data.

Accordingly, the decoder 325 may decode the first video data Imga from the first video source ISa, the second video data Imgb from the second video source ISb, and the third video data Imgc from the third video source ISc, and may output the decoded first video data Imga, second video data Imgb, and third video data Imgc.

In the case where a second common frame rate Ftsb is set based on the first frame rate Fta of the first video data Imga, the second frame rate Ftb of the second video data Imgb, and a third frame rate of the third video data Imgc, the first image output interface 10a may output the first video data Imga based on the second common frame rate Ftsb.

The second image output interface 10b may output the second video data Imgb and the third video data Imgc based on the second common frame rate Ftsb. Accordingly, the second common frame rate Ftsb may be set, and thus the plurality of video data may be processed in a synchronized manner. Meanwhile, the second common frame rate Ftsb may be greater than or equal to the common frame rate Fts. Accordingly, as the number of the plurality of video data increases, the common frame rate Fts increases.

Meanwhile, by decoding the third video data Imgc from the third video source ISc and the fourth video data Imgd from the fourth video source ISd, the decoder 325 may further output the decoded third video data Imgc and fourth video data Imgd. In the case where a third common frame rate Ftsc is set based on the first frame rate Fta of the first video data Imga, the second frame rate Ftb of the second video data Imgb, the third frame rate of the third video data Imgc, and a fourth frame rate of the fourth video data Imgd, the first image output interface 10a may output the first video data Imga based on the third common frame rate Ftsc, and the second image output interface 10b may output the second video data Imgb, the third video data Imgc, and the fourth video data Imgd based on the third common frame rate Ftsc. Accordingly, the third common frame rate Ftsc may be set, and thus the plurality of video data may be processed in a synchronized manner.

Meanwhile, the third common frame rate Ftsc may be greater than or equal to the common frame rate Fts. Accordingly, as the number of the plurality of video data increases, the common frame rate Fts increases.

Meanwhile, unlike FIGS. 10 to 12, the signal processing device 170 may receive and process the first to fourth video data.

Figure 13:
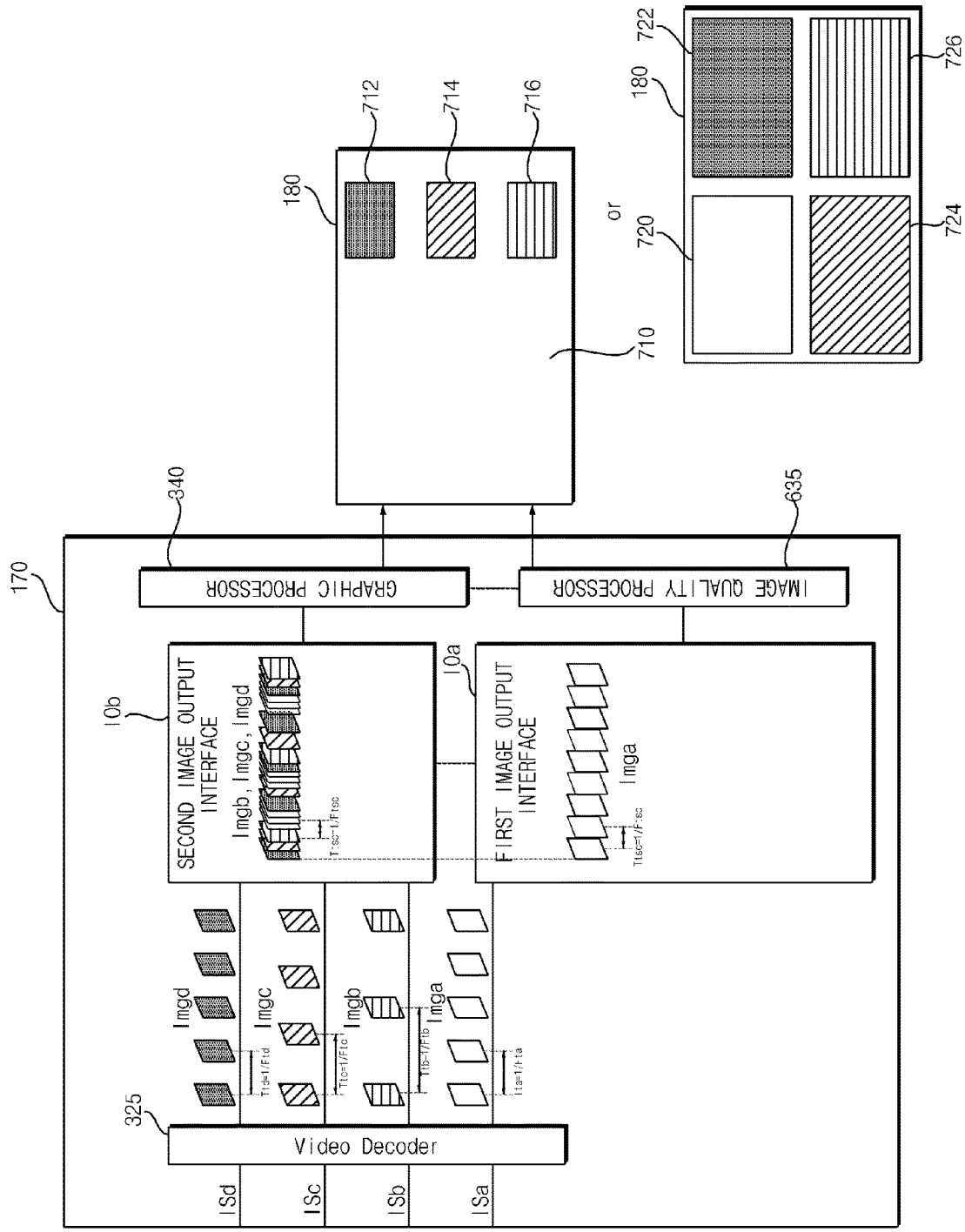

FIG. 13 is a diagram illustrating an example of an internal block diagram of a signal processing device according to another embodiment of the present disclosure.

Referring to the drawing, the signal processing device 170 includes the decoder 325, the first image output interface 10a, the second image output interface 10b, the image quality processor 635, and the graphic processor 340.

The decoder 325 may decode the first video data Imga from the first video source ISa, the second video data Imgb from the second video source ISb, the third video data Imgc from the third video source ISc, and the fourth video data Imgd from the fourth video source ISd, and may output the decoded first video data Imga, second video data Imgb, third video data Imgc, and fourth video data Imgd.

In this case, frame periods of the respective video data Imga to Imgd from the plurality of video sources ISa to ISd may be Tta, Ttb, Ttc, and Ttd, and thus frame rates of the respective video data Imga to Imgd from the plurality of video sources ISa to ISd may be Fta, Ftb, Ftc, and Ftd.

Meanwhile, the first image output interface 10a or the second image output interface 10b may set the third common frame rate Ftsc based on the first frame rate Fta of the first video data Imga, the second frame rate Ftb of the second video data Imgb, the third frame rate Ftc of the third video data Imgc, and the fourth frame rate Ftd of the fourth video data Imgd.

Meanwhile, in the case where the third common frame rate Ftsc is set based on the first frame rate Fta of the first video data Imga, the second frame rate Ftb of the second video data Imgb, the third frame rate of the third video data Imgc, and the fourth frame rate of the fourth video data Imgd, the first image output interface 10a may output the first video data Imga based on the third common frame rate Ftsc.

Meanwhile, the second image output interface 10b may output the second video data Imgb, the third video data Imgc, and the fourth video data Imgd based on the third common frame rate Ftsc. Accordingly, the third common frame rate Ftsc may be set, and thus the plurality of video data Imga to Imgd may be processed in a synchronized manner.

Meanwhile, the third common frame rate Ftsc may be greater than or equal to the common frame rate Fts. Accordingly, as the number of the plurality of video data increases, the common frame rate Fts increases.

Meanwhile, the first image output interface 10a and the second image output interface 10b may operate in synchronization with each other. Accordingly, by using the first image output interface 10a and the second image output interface 10b, the plurality of video data may be processed in a synchronized manner.

Meanwhile, the image quality processor 635 and the graphic processor 340 may operate in synchronization with each other. Accordingly, by using the image quality processor 635 and the graphic processor 340, the plurality of video data may be processed in a synchronized manner.

Meanwhile, the first image output interface 10a may output the first video data Imga based on a common vertical synchronization signal for the plurality of video data, and the second image output interface 10b may output the remaining video data Imgb to Imgd, except the first video data Imga, based on the common vertical synchronization signal for the plurality of video data. Accordingly, the plurality of video data Imga to Imgd may be processed in a synchronized manner.

Meanwhile, as the number of the plurality of video sources increases, the common frame rate Fts may increase in a range of a first reference value or below. Accordingly, as the number of the plurality of video data increases, the common frame rate Fts increases.

While the present disclosure has been particularly shown and described with reference to preferred embodiments thereof, it will be understood by those skilled in the art that the present disclosure is not limited to those exemplary embodiments and various changes in form and details may be made therein without departing from the scope and spirit of the invention as defined by the appended claims and should not be individually understood from the technical spirit or prospect of the present disclosure.

INDUSTRIAL APPLICABILITY

The present disclosure may be applied to a signal processing device and an image display apparatus including the same.

What is claimed is:

1. A signal processing device comprising:
    a decoder configured to decode a first video data from a first video source and a second video data from a second video source, and to output the decoded first video data and second video data;
    an image quality processor, in response to a common frame rate set based on a first frame rate of the first video data and a second frame rate of the second video data, configured to output the first video data based on the common frame rate;
    a graphic processor configured to output the second video data based on the common frame rate;
    a first image output interface configured to output the first video data to the image quality processor based on the common frame rate; and
    a second image output interface configured to output the second video data to the graphic processor based on the common frame rate.

2. The signal processing device of claim 1, wherein:
    based on the common frame rate, the graphic processor outputs the second video data by performing rendering; and
    based on the common frame rate, the image quality processor outputs the second video data by performing rendering.

3. The signal processing device of claim 1, wherein the first image output interface or the second image output interface sets the common frame rate based on the first frame rate of the first video data and the second frame rate of the second video data.

4. The signal processing device of claim 3, wherein the first image output interface or the second image output interface sets, as the common frame rate, a least common multiple of the first frame rate of the first video data and the second frame rate of the second video data.

5. The signal processing device of claim 1, wherein in response to the least common multiple of the first frame rate of the first video data and the second frame rate of the second video data being not obtained, the first image output interface or the second image output interface sets an approximate value as the common frame rate.

6. The signal processing device of claim 1, wherein by decoding a third video data from a third video source, the decoder further outputs the decoded third video data,
    wherein in response to a second common frame rate set based on the first frame rate of the first video data, the second frame rate of the second video data, and a third frame rate of the third video data, the first image output interface outputs the first video data based on the second common frame rate, and the second image output interface outputs the second video data and the third video data based on the second common frame rate.

7. The signal processing device of claim 6, wherein the second common frame rate is greater than or equal to the common frame rate.

8. The signal processing device of claim 1, wherein by decoding a third video data from a third video source and a fourth video data from a fourth video source, the decoder further outputs the decoded third video data and fourth video data,
    wherein in response to a third common frame rate set based on the first frame rate of the first video data, the second frame rate of the second video data, a third frame rate of the third video data, and a fourth frame rate of the fourth video data, the first image output interface outputs the first video data based on the third common frame rate, and the second image output interface outputs the second video data, the third video data, and the fourth video data based on the third common frame rate.

9. The signal processing device of claim 8, wherein the third common frame rate is greater than or equal to the common frame rate.

10. The signal processing device of claim 1, wherein a size of the first video data output by the image quality processor is greater than or equal to a size of the second video data output by the graphic processor.

11. A signal processing device comprising:
    a decoder configured to decode a plurality of video data from a plurality of video sources;
    a first image output interface configured to output a first video data among the plurality of video data based on a common frame rate for the plurality of video data decoded by the decoder;
    an image quality processor configured to perform rendering of the first video data output from the first image output interface, and to output the rendered first video data;
    a second image output interface configured to output remaining video data, except the first video data, among the plurality of video data based on the common frame rate; and
    a graphic processor configured to perform rendering of the remaining video data output from the second image output interface, and to output the rendered remaining video data.

12. The signal processing device of claim 11, wherein the first image output interface and the second image output interface operate in synchronization with each other.

13. The signal processing device of claim 11, wherein the image quality processor and the graphic processor operate in synchronization with each other.

14. The signal processing device of claim 11, wherein the first image output interface outputs the first video data based on a common vertical synchronization signal for the plurality of video data,
    wherein based on the common vertical synchronization signal for the plurality of video data, the second image output interface outputs the remaining video data except the first video data.

15. The image display apparatus of claim 1, wherein as a number of the plurality of video sources increases, the common frame rate increases in a range of a first reference value or below.

16. An image display apparatus comprising:
    a display; and
    a signal processing device configured to output image data to the display, wherein the signal processing device comprises:

a decoder configured to decode a first video data from a first video source and a second video data from a second video source, and to output the decoded first video data and second video data;

an image quality processor, in response to a common frame rate set based on a first frame rate of the first video data and a second frame rate of the second video data, configured to output the first video data based on the common frame rate;

a graphic processor configured to output the second video data based on the common frame rate;

a first image output interface configured to output the first video data to the image quality processor based on the common frame rate; and a second image output interface configured to output the second video data to the graphic processor based on the common frame rate.

17. The image display apparatus of claim 16, wherein:

based on the common frame rate, the graphic processor outputs the second video data by performing rendering; and based on the common frame rate, the image quality processor outputs the second video data by performing rendering.

18. The image display apparatus of claim 16, wherein by decoding a third video data from a third video source, the decoder further outputs the decoded third video data, wherein in response to a second common frame rate set based on the first frame rate of the first video data, the second frame rate of the second video data, and a third frame rate of the third video data, the first image output interface outputs the first video data based on the second common frame rate, and the second image output interface outputs the second video data and the third video data based on the second common frame rate.

* * * * *